(12) United States Patent
Ye et al.

(10) Patent No.: US 9,722,517 B2
(45) Date of Patent: Aug. 1, 2017

(54) SYSTEMS AND METHODS FOR ROTOR POSITION DETERMINATION

(71) Applicant: McMaster University, Hamilton (CA)

(72) Inventors: Jin Ye, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 14/676,110

(22) Filed: Apr. 1, 2015

(65) Prior Publication Data
US 2015/0280626 A1    Oct. 1, 2015

Related U.S. Application Data

(60) Provisional application No. 61/973,488, filed on Apr. 1, 2014.

(51) Int. Cl.
*H02P 25/089*    (2016.01)
*H02P 6/18*    (2016.01)

(52) U.S. Cl.
CPC .............. *H02P 6/186* (2013.01); *H02P 25/089* (2016.02)

(58) Field of Classification Search
CPC ............................... H02P 6/186; H02P 25/083
See application file for complete search history.

(56) References Cited

U.S. PATENT DOCUMENTS

| | | | | |
|---|---|---|---|---|
| 5,825,113 A * | 10/1998 | Lipo | ......................... | H02P 9/40 310/162 |
| 5,936,373 A * | 8/1999 | Li | ........................ | H02K 19/103 310/166 |
| 2002/0135254 A1 * | 9/2002 | Peachee | .................. | H02K 1/148 310/166 |
| 2003/0107342 A1 * | 6/2003 | Gallegos-Lopez | ....... | H02P 9/40 318/701 |
| 2004/0070362 A1 * | 4/2004 | Patel | ....................... | H02P 21/00 318/701 |
| 2008/0272721 A1 * | 11/2008 | Mayes | .................... | H02P 25/08 318/400.17 |

(Continued)

FOREIGN PATENT DOCUMENTS

| | | |
|---|---|---|
| CA | 2168162 | 9/1996 |
| EP | 784377 | 7/1999 |

*Primary Examiner* — Shawki S Ismail
*Assistant Examiner* — Muhammad S Islam
(74) *Attorney, Agent, or Firm* — Bereskin & Parr LLP/S.E.N.C.R.L. s.r.l.

(57) ABSTRACT

Various embodiments are described herein for a system and method to eliminate mutual flux effect on rotor position estimation of switched reluctance motor (SRM) drives at rotating shaft conditions without a prior knowledge of mutual flux. Neglecting the magnetic saturation, the operation of conventional self-inductance estimation using phase current slope difference method can be classified into three modes: Mode I, II and III. At positive-current-slope and negative-current-slope sampling point of one phase, the sign of current slope of the other phase changes in Mode I and II, but does not change in Mode III. In one example embodiment, in order to operate the self-inductance estimation in Mode III, a variable-hysteresis-band current control method is proposed for the incoming phase and variable-sampling method is proposed for the outgoing phase.

23 Claims, 23 Drawing Sheets

(56) References Cited

U.S. PATENT DOCUMENTS

| | | | |
|---|---|---|---|
| 2008/0315896 A1* | 12/2008 | Fahimi | G01R 31/34 324/603 |
| 2011/0285332 A1* | 11/2011 | Pollock | H02P 6/18 318/400.02 |
| 2013/0069577 A1* | 3/2013 | Lee | B62D 5/0463 318/432 |
| 2013/0082630 A1 | 4/2013 | Purfuest et al. | |

* cited by examiner

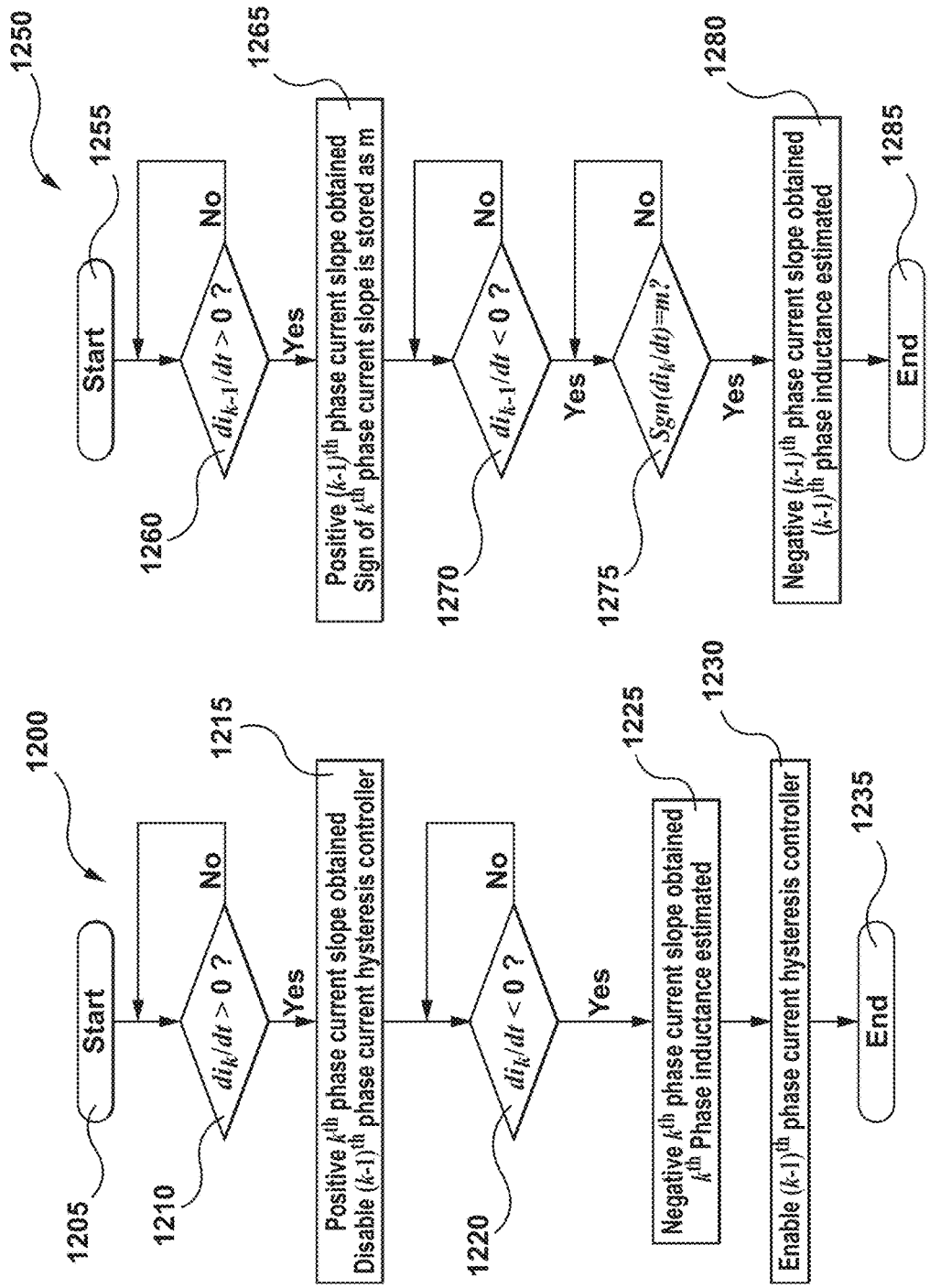

SYSTEMS AND METHODS FOR ROTOR POSITION DETERMINATION

CROSS-REFERENCE TO RELATED APPLICATION

This application claims the benefit of U.S. Provisional Patent Application No. 61/973,488 filed Apr. 1, 2014, the contents of which are incorporated herein by reference.

TECHNICAL FIELD

The described embodiments relate generally to rotor position determination of a switched reluctance motor, and in particular, to rotor position determination of a switched reluctance motor displaying mutual flux effect without having a priori knowledge of the mutual flux effect.

BACKGROUND

A switched reluctance motor (SRM) is a type of synchronous AC machine that converts reluctance torque into mechanical power. Switched reluctance motors are emerging as promising candidates in automotive applications due to the absence of rotor windings and permanent magnets on the rotor.

Typically, an encoder or resolver is installed in the switched reluctance motors to obtain the rotor position and speed for the torque or speed control of the motor. The disadvantages associated with this technique include increased cost and volume of the motor, as well as reduced reliability.

Other conventional techniques for rotor position determination include inductance based and flux-linkage based rotor position estimation methods. However, as the speed of the switched reluctance motor increases, the overlapping region of the active phases becomes significant and mutual flux effect between the active phases increases. Consequently, the accuracy of these conventional rotor position determination techniques is decreased.

SUMMARY

In one aspect, at least one embodiment described herein provides a switched reluctance motor system. The switched reluctance motor system comprises a multi-phase switched reluctance motor and a controller coupled to the multi-phase switched reluctance motor, where the controller is configured to operate the multi-phase switched reluctance motor in an error reduction mode. In the error reduction mode, when a positive slope of a phase current corresponding to a first phase of the multi-phase switched reluctance motor is sampled at a first sample time and when a negative slope of the phase current corresponding to the first phase of the multi-phase switched reluctance motor is sampled at a second sample time, the slopes of a phase current corresponding to a second phase of the multi-phase switched reluctance motor have the same sign at the first sample time and the second sample time.

In various embodiments, in the error reduction mode, error corresponding to self-inductance estimation of the first phase due to mutual flux from the second phase is reduced.

In some embodiments, if the first phase of the multi-phase switched reluctance motor is an incoming phase, the controller is configured to apply a variable-hysteresis-band current control method, and if the first phase of the multi-phase switched reluctance motor is an outgoing phase, the controller is configured to apply a variable-sampling method.

In various embodiments where the first phase of the multi-phase switched reluctance motor is an incoming phase, the controller is configured to control the switching state of the phase current of an outgoing phase wherein the phase current of the outgoing phase remains unchanged between the first sample time and the second sample time.

In various embodiments, the controller comprises a voltage source and at least one switch coupled to the voltage source. In some embodiments, if the phase current of the outgoing phase is lower than a low reference current, the controller is configured to turn on the at least one switch. In some other embodiments, if the phase current of the outgoing phase is higher than a high reference current, the controller is configured to turn off the at least one switch.

In various embodiments where the first phase of the multi-phase switched reluctance motor is an outgoing phase, the controller is configured to adjust the second sample time to a new second sample time, wherein at the new second sample time, the outgoing phase is sampled at the negative slope of the corresponding phase current, and the phase current corresponding to an incoming phase of the multi-phase switched reluctance motor has the same sign as the sign of the slope of the incoming phase current at the first sample time.

In some embodiments, the controller is further configured to generate a rotor position based on self-inductance estimation of each phase of the multi-phase switched reluctance motor.

In some embodiments, for each phase of the multi-phase switched reluctance motor, the controller is configured to determine self-inductance of the phase in an active region corresponding to that phase, and determine a rotor position corresponding to the active region based on the self-inductance.

In some embodiments, if the self-inductance of the phase reaches a maximum value, the controller is configured to estimate self-inductance and rotor position in a second active region corresponding to the incoming phase.

In another aspect, in at least one embodiment described herein, there is provided a method of determining rotor position of a multi-phase switched reluctance motor. The method comprises determining self-inductance of an incoming phase of the multi-phase switched reluctance motor in an error reduction mode, wherein, for each phase of the multi-phase switched reluctance motor, the error corresponding to the self-inductance of the incoming phase of due to mutual flux from an outgoing phase is reduced; and generating a rotor position corresponding to the incoming phase based on the self-inductance of the incoming phase.

In various embodiments, the determining of the self-inductance of the incoming phase in an error reduction mode comprises sampling a positive slope of a phase current corresponding to a first phase of the multi-phase switched reluctance motor at a first sample time, sampling a negative slope of the phase current corresponding to the first phase of the multi-phase switched reluctance motor at a second sample time, and adjusting at least one characteristic of a phase current corresponding to a second phase of the multi-phase switched reluctance motor, wherein the slopes of the phase current corresponding to the second phase have the same sign at the first sample time and the second sample time.

In various embodiments, if the first phase of the multi-phase switched reluctance motor is an incoming phase, adjusting the at least one characteristic of the phase current corresponding to the second phase comprises controlling the switching state of the phase current of the second phase wherein the phase current of the outgoing phase remains unchanged between the first sample time and the second sample time, the second phase being an outgoing phase.

In some embodiments, where the phase current of the outgoing phase is lower than a low reference current, the method comprises switching on the phase current of the outgoing phase. In some other embodiments, where the phase current of the outgoing phase is higher than a high reference current, the method comprises switching off the phase current of the outgoing phase.

In various embodiments, if the first phase of the multi-phase switched reluctance motor is an outgoing phase, adjusting the at least one characteristic of the phase current corresponding to the second phase comprises adjusting the second sample time to a new second sample time, wherein at the new second sample time, the outgoing phase is sampled at the negative slope of the corresponding phase current, and the phase current corresponding to the second phase of the multi-phase switched reluctance motor has the same sign as the sign of the slope of the phase current corresponding to the second phase at the first sample time, the second phase being an incoming phase.

In various embodiments, for each phase of the multi-phase switched reluctance motor, the method comprises determining self-inductance of the phase in an active region corresponding to that phase, and determining a rotor position corresponding to the active region based on the self-inductance.

In another aspect, in at least one embodiment described herein, there is provided a method of reducing error in estimating self-inductance of a first phase due to mutual flux from a second phase in a multi-phase switched reluctance motor. The method comprises operating the multi-phase switched reluctance motor in an error reduction mode, wherein when a positive slope of a phase current corresponding to the first phase of the multi-phase switched reluctance motor is sampled at a first sample time and when a negative slope of the phase current corresponding to the first phase of the multi-phase switched reluctance motor is sampled at a second sample time, the slopes of a phase current corresponding to the second phase of the multi-phase switched reluctance motor have the same sign at the first sample time and the second sample time.

In another embodiment, the method of reducing error operates in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and which will now be briefly described.

FIG. 12A illustrates an example embodiment of a method of self-inductance determination based on variable-hysteresis-band current.

FIG. 12B illustrates an example embodiment of a method of self-inductance determination based on variable-sampling.

Figure 1A:
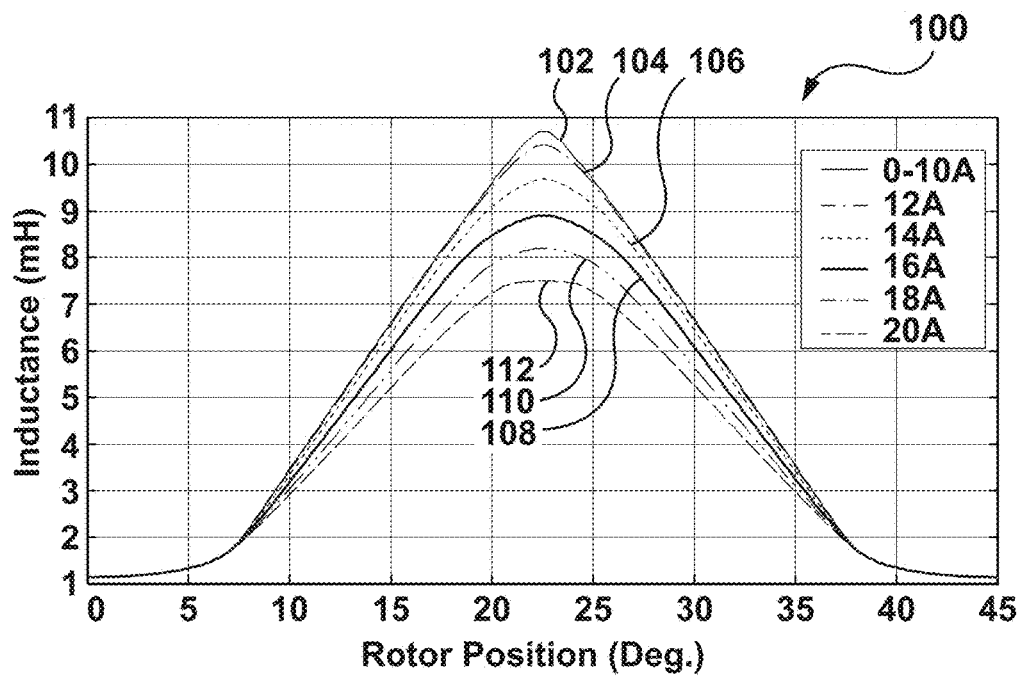
FIG. 1A illustrates a graphical representation of comparisons of inductance profiles of a 12/8 SRM for various current settings according to an example embodiment.

The drawings are provided for the purposes of illustrating various aspects and features of the example embodiments described herein. For simplicity and clarity of illustration, elements shown in the FIGS. have not necessarily been drawn to scale. Further, where considered appropriate, reference numerals may be repeated among the FIGS. to indicate corresponding or analogous elements.

DETAILED DESCRIPTION

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments of the devices, systems and methods described herein may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof.

In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The various embodiments disclosed herein relate to systems and methods of determining position of a rotor of a switched reluctance motor. In particular, the various embodiments disclosed herein relate to systems and methods of determining position of a rotor of a switched reluctance motor in scenarios where the mutual flux effect between active phases of the switched reluctance motor is significant. The mutual flux effect between the active phases of the switched reluctance motor increases as the speed of the switched reluctance motor increases.

Various magnetic characteristics of a switched reluctance motor, such as flux, self-inductance and back electromagnetic force (EMF) etc., are rotor position dependent. In some cases, these parameters may be estimated to obtain the rotor position.

In some other cases, the rotor position may be obtained by using pulse injection method, where a high-frequency signal is injected to the inactive phase of the switched reluctance motor to obtain inductance, which is later converted to rotor position. However, voltage injection methods often suffer from either additional power losses or low speed constraint.

In some further cases, passive rotor position estimation methods based on measurement of terminal voltage and phase current of active phases may also be used to obtain rotor position. An example of a passive rotor position estimation method includes estimating the flux linkage of the switched reluctance motor. In cases where the flux linkage is obtained by using the integration of the terminal voltage subtracted by the voltage across an ohmic resistance, this method shows poor accuracy at low speed when back EMF is small. Furthermore, the accuracy is deteriorated by variation of the ohmic resistance and accumulation error due to integration.

Another example of a passive rotor position estimation method includes self-inductance-based rotor position estimation. By neglecting the variation of the speed, back EMF and ohmic resistance in a switching period of the switched reluctance motor, the self-inductance is estimated by measuring the phase current slope difference. Compared to flux linkage methods, the influence of the variation of resistance is eliminated and it is capable of operating at low speeds. However, as the speed of the switched reluctance motor increases, the overlapping region of the active phases becomes significant and mutual flux cannot be neglected anymore. Consequently, the accuracy of both inductance-based and flux linkage-based rotor position estimation methods is decreased at higher speed due to mutual flux between active phases.

In some cases, a torque sharing function (TSF) is used in a switched reluctance motor for instantaneous torque control and reduction in commutation torque ripples. In cases where a TSF is used in the switched reluctance motor, overlapping areas of incoming and outgoing phases become significant even at low speed. Consequently, mutual flux starts having a significant effect on accurate estimation of rotor position over a wide speed range.

The various embodiments described herein relate to determining rotor position by compensating for mutual flux effect without any a priori knowledge of mutual flux linkage profiles of switched reluctance motor. In various embodiments disclosed herein, the systems and methods of rotor position determination include generating a dynamic model of a switched reluctance motor incorporating mutual flux, deriving a self-inductance estimation error due to mutual flux, and identifying an operational mode where at the positive-current-slope and negative-current-slope sampling point of a phase, the sign of the current slope of the other phase does not change, and accordingly, mutual flux effect on self-inductance estimation does not exist.

The systems and methods of rotor position determination of various embodiments disclosed herein also include adjusting the mode of operation of the switched reluctance motor to a desired mode where the impact of mutual flux on estimation of self-inductances does not exist. The mode of operation is controlled by applying variable-hysteresis-band current control method in the incoming-phase self-inductance estimation and variable-sampling method for the outgoing-phase self-inductance estimation, as discussed in greater detail below.

Circuit Modeling of SRM with Mutual Flux

In a three-phase SRM, no more than two phases are conducted simultaneously. In the various embodiments illustrated herein, the incoming and outgoing phases during commutation are denoted as $k^{th}$ and $(k-1)^{th}$ phases, respectively. Phase voltage equations for the $k^{th}$ and $(k-1)^{th}$ phases are derived as (1) and (2) respectively.

$$v_k = Ri_k + \frac{\partial \lambda_k}{\partial t} \tag{1}$$

$$v_{k-1} = Ri_{k-1} + \frac{\partial \lambda_{k-1}}{\partial t} \tag{2}$$

where $v_k$, $i_k$ and $\lambda_k$ are the phase voltage, current and flux linkage of $k^{th}$ phase, respectively, and $v_{k-1}$, $i_{k-1}$ and $\lambda_{k-1}$ are the phase voltage, current and flux linkage of $(k-1)^{th}$ phase, respectively.

As the speed of SRM increases, overlapping areas of the two phases are increased significantly due to higher back electromagnetic force. This causes the effect of mutual flux to increase, which cannot be neglected. When mutual flux is considered, flux linkage for incoming phase and outgoing phase is expressed as (3) and (4) respectively.

$$\lambda_k = \lambda_{k,k} + \lambda_{k,k-1} \tag{3}$$

$$\lambda_{k-1} = \lambda_{k-1,k-1} + \lambda_{k-1,k} \tag{4}$$

where $\lambda_{k,k}$ and $\lambda_{k-1,k-1}$ are the self-flux linkages of $k^{th}$ and $(k-1)^{th}$ phase and $\lambda_{k,k-1}$ and $\lambda_{k-1,k}$ are mutual flux linkages.

If magnetic saturation is neglected, the flux linkage is a linear function of the inductance. Accordingly, equations (3) and (4) are reorganized as (5).

$$\begin{bmatrix} \lambda_k \\ \lambda_{k-1} \end{bmatrix} = \begin{bmatrix} L_{k,k} & M_{k,k-1} \\ M_{k-1,k} & L_{k-1,k-1} \end{bmatrix} \begin{bmatrix} i_k \\ i_{k-1} \end{bmatrix} \tag{5}$$

where $L_{k,k}$ and $L_{k-1,k-1}$ are the self-inductances of the $k^{th}$ and $(k-1)^{th}$ phase, and $M_{k,k-1}$ and $M_{k-1,k}$ are the mutual inductances.

In a switched reluctance motor, the mutual inductance between two conducted phases is equal and therefore meets the equation (6).

$$M_{k,k-1} = M_{k-1,k} \tag{6}$$

In view of the mutual inductance property of the two conducting phases, the phase voltage equations is derived as equation (7).

$$\begin{bmatrix} v_k \\ v_{k-1} \end{bmatrix} = R \begin{bmatrix} i_k \\ i_{k-1} \end{bmatrix} + \begin{bmatrix} L_{k,k} & M_{k,k-1} \\ M_{k-1,k} & L_{k-1,k-1} \end{bmatrix} \begin{bmatrix} \frac{di_k}{dt} \\ \frac{di_{k-1}}{dt} \end{bmatrix} + \omega_m \begin{bmatrix} \frac{\partial L_{k,k}}{\partial \theta} & \frac{\partial M_{k,k-1}}{\partial \theta} \\ \frac{\partial M_{k-1,k}}{\partial \theta} & \frac{\partial L_{k-1,k-1}}{\partial \theta} \end{bmatrix} \begin{bmatrix} i_k \\ i_{k-1} \end{bmatrix} \tag{7}$$

where $\theta$ and $\omega_m$ are rotor position and angular speed of SRM respectively.

Electromagnetic torque of $k^{th}$ phase is represented as (8) neglecting magnetic saturation.

$$T_k(\theta, i) = \frac{1}{2} \frac{\partial L(\theta, i_k)}{\partial \theta} i_k^2 \tag{8}$$

where $T_k$ is the torque produced by $k^{th}$ phase, and $i_k$ is the $k^{th}$ phase current.

For a n-phase SRM, total electromagnetic torque T is represented as (9).

$$T = \Sigma_{k=1}^n T_k \tag{9}$$

Analysis of Mutual Flux of SRM

Reference is first made to FIG. 1A, which illustrates a graphical representation 100 of comparisons of inductance profiles of a 12/8 SRM for various current settings according to an example embodiment. In the illustrated embodiment, the finite element analysis (FEA) of the SRM is conducted in JMAG software.

FIG. 1A illustrates non-linear inductance profiles of a 12/8 SRM as a function of rotor positions for various current settings between 0-20 amperes ("A"). Graph 102 illustrates the non-linear inductance profile of a 12/8 SRM with current settings between 0-10 A. Graph 104 illustrates the non-linear inductance profile of a 12/8 SRM with the current setting of 12 A. Graph 106 illustrates the non-linear inductance profile of a 12/8 SRM with the current setting of 14 A. Graph 108 illustrates the non-linear inductance profile of a 12/8 SRM with the current setting of 16 A. Graph 110 illustrates the non-linear inductance profile of a 12/8 SRM with the current setting of 18 A. Graph 112 illustrates the non-linear inductance profile of a 12/8 SRM with the current setting of 20 A.

Figure 1B:
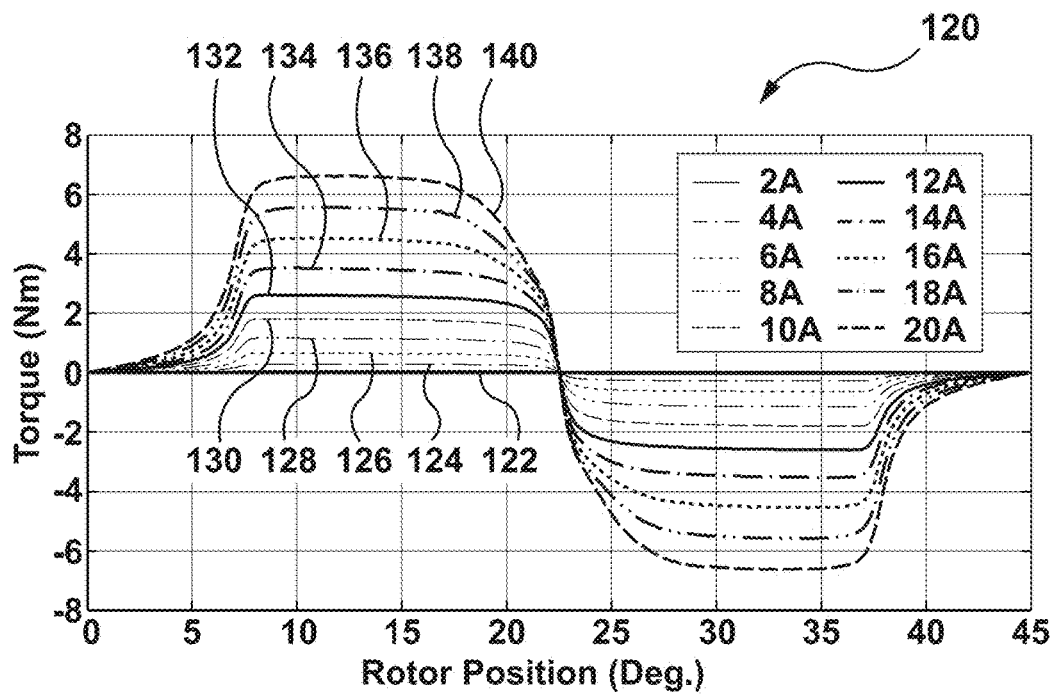
FIG. 1B illustrates a graphical representation of comparisons of torque profiles of a 12/8 SRM for various current settings according to an example embodiment.

Reference is next made to FIG. 1B, which illustrates a graphical representation 120 of comparisons of torque profiles of a 12/8 SRM for various current settings according to an example embodiment. In particular, FIG. 1B illustrates non-linear torque profiles of a 12/8 SRM as a function of rotor positions for various current settings between 2-20 A.

Graph 122 illustrates the non-linear torque profile of a 12/8 SRM with the current setting of 2 A. Graph 124 illustrates the non-linear torque profile of a 12/8 SRM with the current settings of 4 A. Graph 126 illustrates the non-linear torque profile of a 12/8 SRM with the current settings of 6 A. Graph 128 illustrates the non-linear torque profile of a 12/8 SRM with the current settings of 8 A. Graph 130 illustrates the non-linear torque profile of a 12/8 SRM with the current settings of 10 A. Graph 132 illustrates the non-linear torque profile of a 12/8 SRM with the current settings of 12 A. Graph 134 illustrates the non-linear torque profile of a 12/8 SRM with the current settings of 14 A. Graph 136 illustrates the non-linear torque profile of a 12/8 SRM with the current settings of 16 A. Graph 138 illustrates the non-linear torque profile of a 12/8 SRM with the current settings of 18 A. Graph 140 illustrates the non-linear torque profile of a 12/8 SRM with the current settings of 20 A.

Figure 2A:
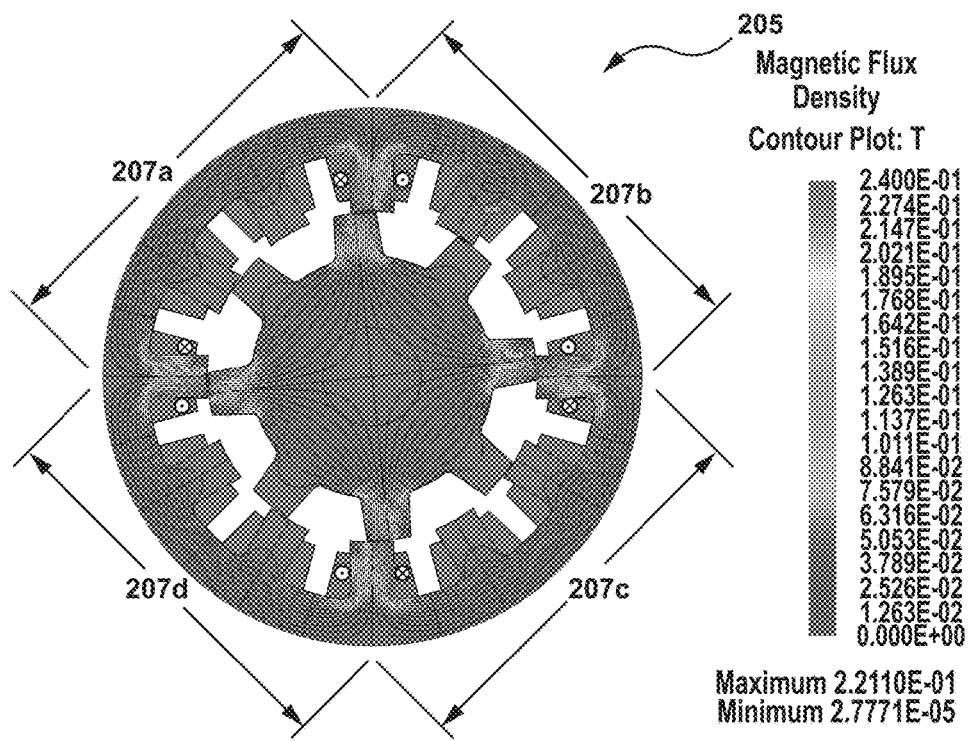
FIG. 2A illustrates a representation of magnetic flux density distribution of a 12/8 SRM during a single phase excitation according to an example embodiment.
Figure 2B:
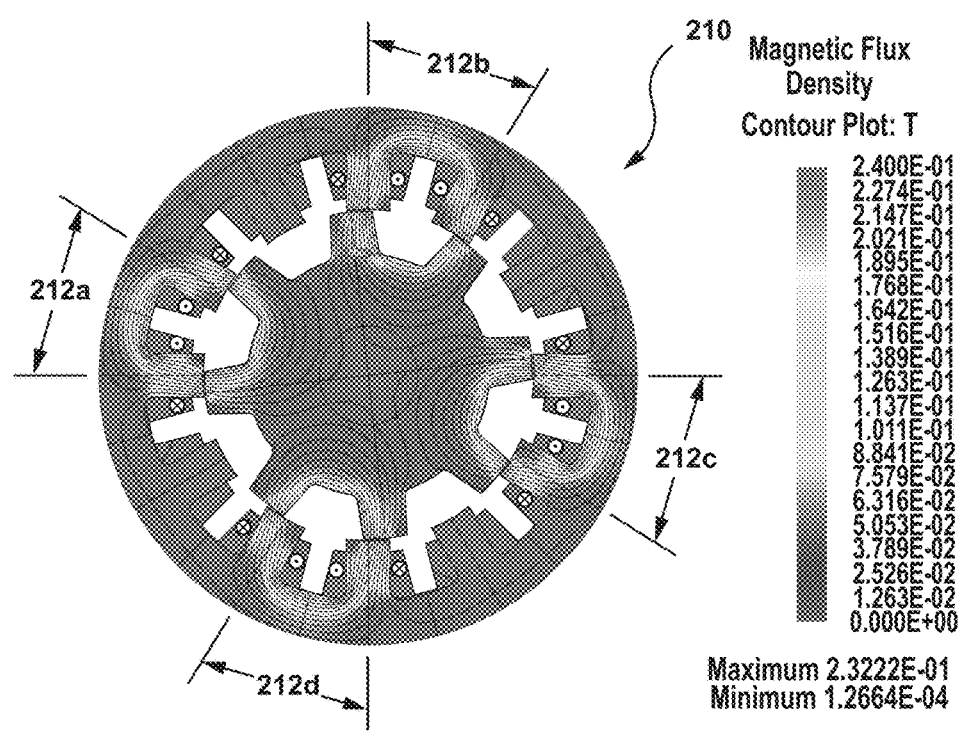
FIG. 2B illustrates a representation of magnetic flux density distribution of a 12/8 SRM during a two-phase excitation according to an example embodiment.

Reference is next made to FIGS. 2A and 2B, where FIG. 2A illustrates the magnetic flux density distribution 205 of a 12/8 SRM during a single-phase excitation according to an example embodiment. FIG. 2B illustrates the magnetic flux density distribution 210 of a 12/8 SRM during a two-phase excitation according to an example embodiment.

As illustrated in FIGS. 2A and 2B, the flux paths 212a, 212b, 212c and 212d resulting from two-phase excitation of a 12/8 SRM are short-flux paths compared to flux paths 207a, 207b, 207c and 207d resulting from single-phase excitation of a 12/8 SRM. As further illustrated in FIG. 2B, the flux linkage of an individual phase includes both self and mutual flux linkage in a two-phase excitation of a 12/8 SRM. Due to alternate polarities of windings of a three-phase motor, mutual flux is always additive and symmetric among individual phases.

Figure 3A:
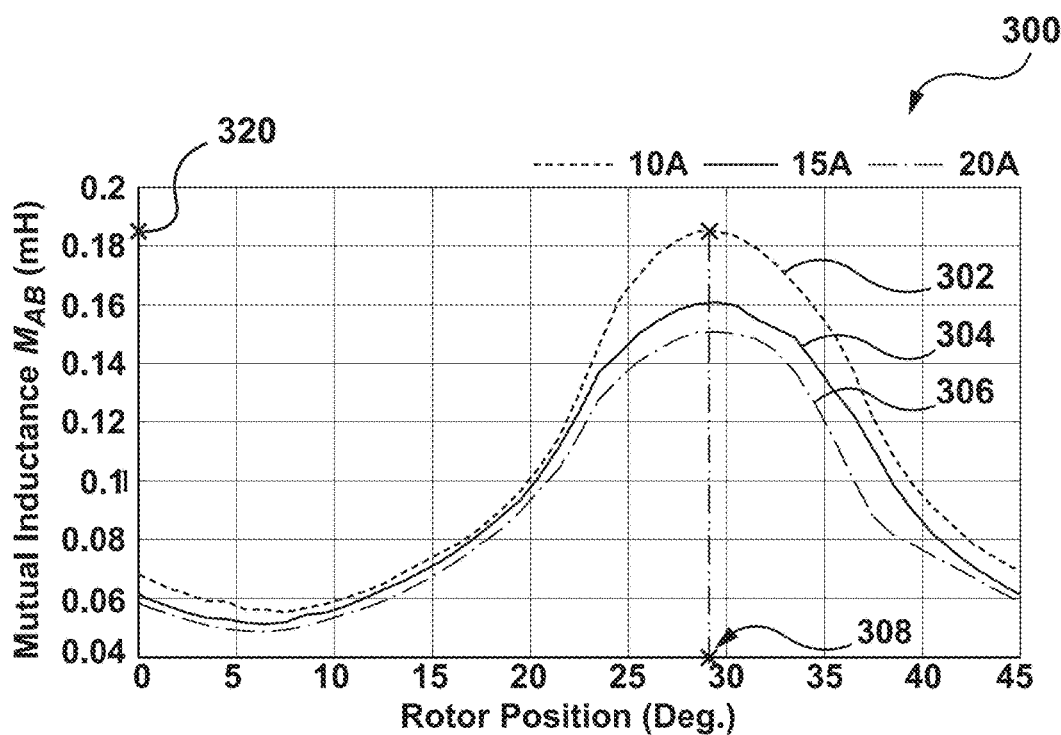
FIG. 3A illustrates a graphical representation of comparisons of mutual inductance profiles between two phases of a three-phase 12/8 SRM for various current settings according to an example embodiment.

Reference is made to FIG. 3A, which illustrates a graphical representation of comparisons of mutual inductance profiles 300 between two phases of a three-phase 12/8 SRM for various current settings according to an example embodiment.

Graph 302 illustrates the mutual inductance profiles $M_{A,B}$ obtained between phases A and B for a current setting of 10 A. Graph 304 illustrates the mutual inductance profiles $M_{A,B}$ obtained between phases A and B for a current setting of 15 A. Graph 306 illustrates the mutual inductance profiles $M_{A,B}$ obtained between phases A and B for a current setting of 20 A.

Figure 3B:
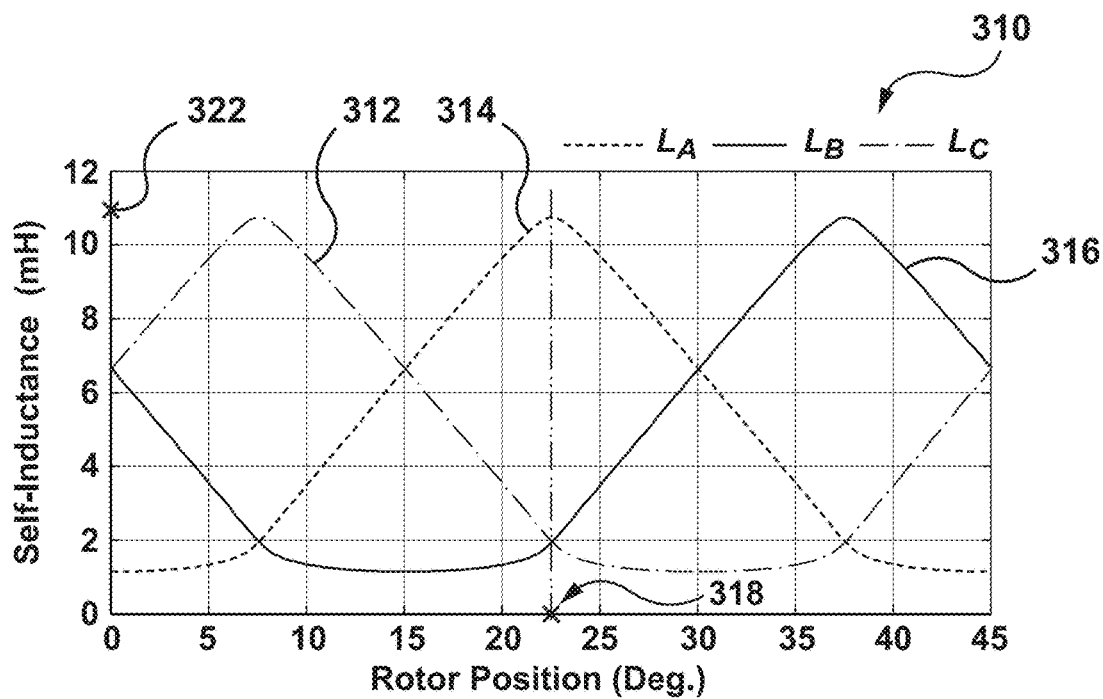
FIG. 3B illustrates a graphical representation of self-inductance profiles of the three phases of a three-phase 12/8 SRM for various current settings according to an example embodiment.

Reference is next made to FIG. 3B, which illustrates a graphical representation of self-inductance profiles 310 of the three phases of a three-phase 12/8 SRM for various current settings according to an example embodiment. Graph 312 illustrates the self-inductance profile of phase C. Graph 314 illustrates the self-inductance profile of phase A and graph 316 illustrates the self-inductance profile of phase B of the three-phase switched reluctance motor.

As illustrated in FIGS. 3A and 3B, the maximum value of mutual inductance 320 is around 2% of the self-inductance 322 at the same current level. Also illustrated in FIGS. 3A and 3B is the spatial relationship between self-inductance and mutual inductance of 12/8 SRM. The mutual inductance profile $M_{A,B}$ at the maximum value 308 is shifted by around 7.5° compared with the self-inductance of phase A, $L_A$ 318.

Self-Inductance Estimation without Considering the Mutual Flux

Figure 4:
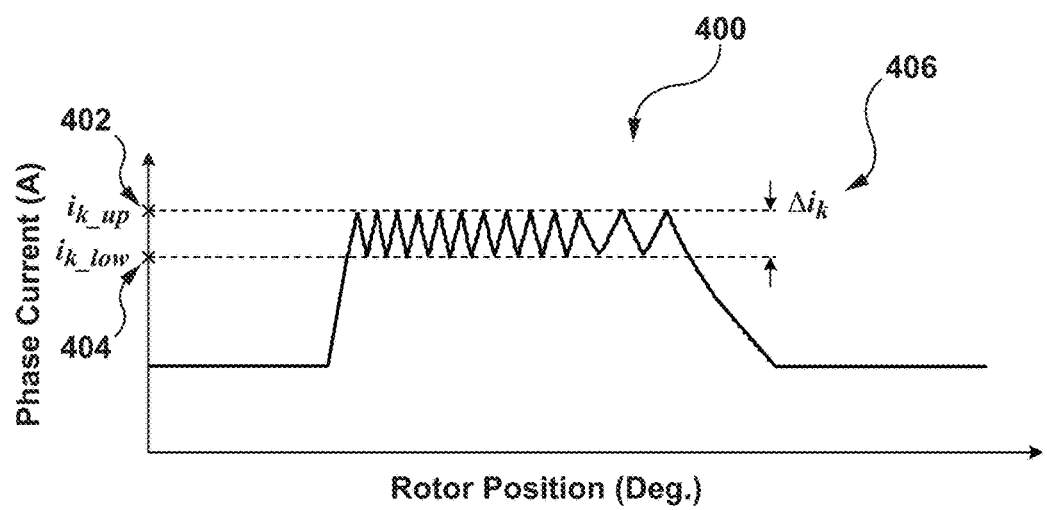
FIG. 4 illustrates the hysteresis control of phase current of a SRM according to an example embodiment.

Reference is made to FIG. 4, which illustrates a hysteresis controller 400 for phase current control. Upper and lower current references of the $k^{th}$ phase are denoted as $i_{k\_up}$ 402 and $i_{k\_low}$ 404, respectively. The hysteresis band 406 is represented as (10).

$$\Delta i_k = i_{k\_up} - i_{k\_low} \qquad (10)$$

Figures 5A, 5B:
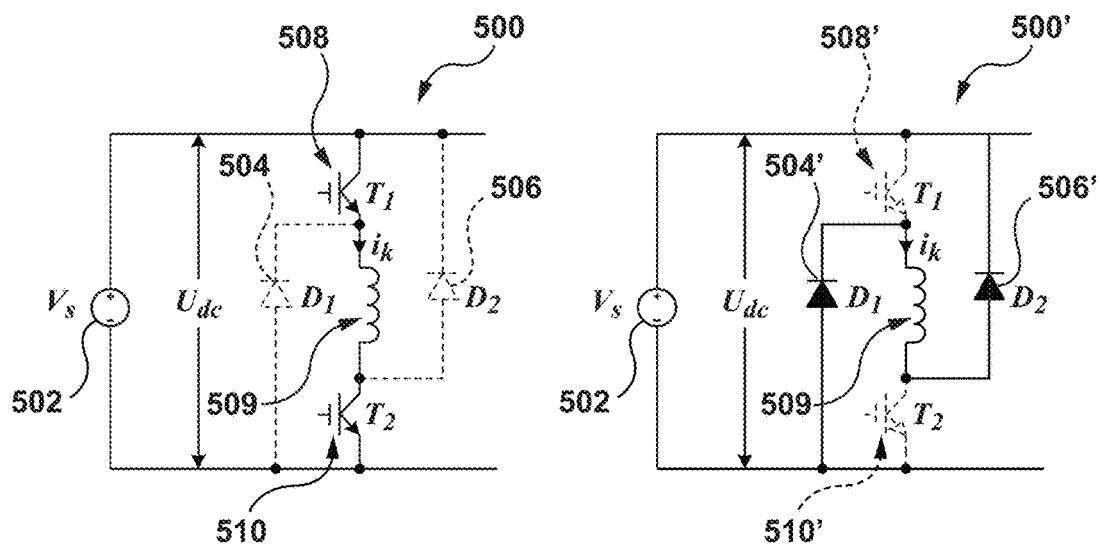
FIG. 5A illustrates a circuit diagram of a SRM drive according to an example embodiment.
FIG. 5B illustrates a circuit diagram of a SRM drive according to another example embodiment.

Reference is next made to FIG. 5A, which illustrates a circuit diagram 500 of a SRM drive according to an example embodiment. The circuit diagram 500 of FIG. 5A includes a voltage source 502, a first switch $T_1$ 508, an inductor 509, a second switch $T_2$ 510, a first diode 504 and a second diode 506. As illustrated, the first switch $T_1$ 508, inductor 509 and the second switch $T_2$ 510 are connected in series to each other and in parallel to the voltage source 502. The first diode 504 is connected between the negative terminal of the voltage source 502 and a point between the first switch $T_1$ 508 and the inductor 509. The second diode 506 is connected between the positive terminal of the voltage source 502 and a point between the inductor 509 and the second switch $T_2$ 510.

In the circuit diagram 500 illustrated in FIG. 5A, the first and second switches $T_1$ 508 and $T_2$ 510 are turned on. As a result, DC-link voltage 502 is applied and a positive phase current slope results. The voltage equation neglecting magnetic saturation when the switches $T_1$ 508 and $T_2$ 510 are turned on is derived as (11).

$$U_{dc} = Ri_k + L_{k,k}\frac{di_k(t_{k\_on})}{dt} + \frac{\partial L_{k,k}}{\partial \theta}i_k\omega_m \qquad (11)$$

where $t_{k\_on}$ is time instant where the $k^{th}$ phase switching state is on during a switching period, $$\frac{di_k(t_{k\_on})}{dt}$$

is the slope of $k^{th}$ phase current at $t_{k\_on}$, and $U_{dc}$ is the DC-link voltage.

FIG. 5B illustrates a circuit diagram 500' of a SRM drive according to another example embodiment. The circuit diagram 500' of FIG. 5B includes a voltage source 502, a first switch $T_1$ 508', an inductor 509, a second switch $T_2$ 510', a first diode 504' and a second diode 506'. As illustrated, the first switch $T_1$ 508', inductor 509 and the second switch $T_2$ 510' are connected in series to each other and in parallel to the voltage source 502. The first diode 504' is connected between the negative terminal of the voltage source 502 and a point between the first switch $T_1$ 508' and the inductor 509. The second diode 506' is connected between the positive terminal of the voltage source 502 and a point between the inductor 509 and the second switch $T_2$ 510'.

In the circuit diagram 500' illustrated in FIG. 5B, the first and second switches $T_1$ 508' and $T_2$ 510' are turned off and the first and second diodes 504' and 506' are on. As a result, DC-link voltage 502 is applied and a negative phase current slope results. The voltage equation neglecting magnetic saturation when the switches $T_1$ 508' and $T_2$ 510' are turned off is derived as (12).

$$-U_{dc} = Ri_k + L_{k,k}\frac{di_k(t_{k\_off})}{dt} + \frac{\partial L_{k,k}}{\partial \theta}i_k\omega_m \qquad (12)$$

where $t_{k\_off}$ is time instant where the $k^{th}$ phase switching state is off during a switching period, $$\frac{di_k(t_{k\_off})}{dt}$$

is the slope of $k^{th}$ phase current at $t_{k\_on}$, and $U_{dc}$ is the DC-link voltage.

In the switched reluctance motors of the embodiments disclosed herein, the switching period is short enough and therefore, variation of the mechanical speed, inductance, back EMF and resistance is neglected. Accordingly, the self-inductance is derived as (13) by combining (11) and (12). For a given DC-link voltage, unsaturated self-inductance can be estimated by using the phase current slope difference between ON and OFF states.

$$L_{k,k} = \frac{2U_{dc}}{\frac{di_k(t_{k\_on})}{dt} - \frac{di_k(t_{k\_off})}{dt}} \qquad (13)$$

where $L_{k,k}$ is estimated $k^{th}$ phase self-inductance without considering the mutual flux.

Analysis of Self-Inductance Estimation Error Due to Mutual Flux

As the speed of the switched reluctance motor increases, the overlapping region becomes significant and the mutual inductance cannot be neglected. Considering the mutual inductance, the $k^{th}$ phase voltage equation is derived as (14) and (15) when $k^{th}$ phase switches are ON state and OFF state, respectively.

$$U_{dc} = Ri_k + L_{k,k}\frac{di_k(t_{k\_on})}{dt} + \frac{\partial L_{k,k}}{\partial \theta}i_k\omega_m + M_{k,k-1}\frac{di_{k-1}(t_{k\_on})}{dt} + \frac{\partial M_{k,k-1}}{\partial \theta}i_{k-1}\omega_m \qquad (14)$$

-continued $$-U_{dc} = Ri_k + L_{k,k}\frac{di_k(t_{k\_off})}{dt} + \frac{\partial L_{k,k}}{\partial \theta}i_k\omega_m + M_{k,k-1}\frac{di_{k-1}(t_{k\_off})}{dt} + \frac{\partial M_{k,k-1}}{\partial \theta}i_{k-1}\omega_m \quad (15)$$

where $$\frac{di_k(t_{k\_on})}{dt} \text{ and } \frac{di_k(t_{k\_off})}{dt}$$

are the slopes of $k^{th}$ phase current at $t_{k\_on}$ and $t_{k\_off}$, respectively.

Since the switching period of the various switched reluctance motors disclosed herein is short, the variation of the mechanical speed, inductance, back EMF and resistance is neglected. The $k^{th}$ phase self-inductance considering the mutual inductance is obtained as (16) by subtracting (14) by (15).

$$L_{k,k\_m} = \frac{2U_{dc} - M_{k,k-1}\left(\frac{di_{k-1}(t_{k\_on})}{dt} - \frac{di_{k-1}(t_{k\_off})}{dt}\right)}{\frac{di_k(t_{k\_on})}{dt} - \frac{di_k(t_{k\_off})}{dt}} \quad (16)$$

where $L_{k,k\_m}$ is the estimated $k^{th}$ phase self-inductance considering mutual flux.

The error of self-inductance estimation due to mutual flux is derived as (17).

$$err_k = \frac{L_{k,k\_m} - L_{k,k}}{L_{k,k\_m}} = \frac{-M_{k,k-1}\left(\frac{di_{k-1}(t_{k\_on})}{dt} - \frac{di_{k-1}(t_{k\_off})}{dt}\right)}{2U_{dc} - M_{k,k-1}\left(\frac{di_{k-1}(t_{k\_on})}{dt} - \frac{di_{k-1}(t_{k\_off})}{dt}\right)} \quad (17)$$

where $err_k$ is $k^{th}$ phase self-inductance estimation error due to the mutual flux from $(k-1)^{th}$ phase.

Figure 6:
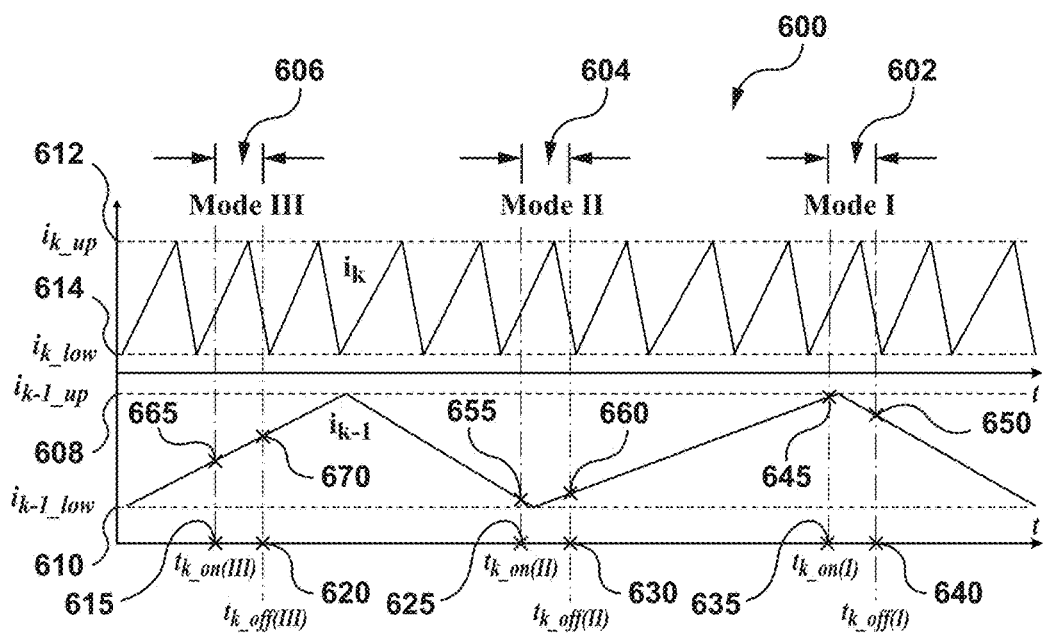
FIG. 6 illustrates three modes during self-inductance estimation of $k^{th}$ phase of a SRM according to an example embodiment.

Reference is made to FIG. 6, which illustrates a graphical representation 600 of three modes during self-inductance estimation of $k^{th}$ phase (incoming phase) of a SRM according to an example embodiment. Since the self-inductance of the incoming phase ($k^{th}$ phase) is much lower, $k^{th}$ phase current slope is much higher than $(k-1)^{th}$ phase. Upper and lower current references of $k^{th}$ phase are denoted as $i_{k\_up}$ 612 and $i_{k\_low}$ 614, and upper and lower current references of $(k-1)^{th}$ phase are denoted as $i_{k-1\_up}$ 608 and $i_{k-1\_low}$ 610.

The positive-current-slope and negative-current-slope of $k^{th}$ phase is sampled at $t_{k\_on(III)}$ 615 and $t_{k\_off(III)}$ 620 in Mode III 606, $t_{k\_on(II)}$ 625 and $t_{k\_off(II)}$ 630 in Mode II 604 and $t_{k\_on(I)}$ 635 and $t_{k\_off(I)}$ 640 in Mode I 602, respectively.

As is discussed in detail below, the self-inductance estimation error results due to mutual flux in Modes II 604 and III 606, whereas self-inductance estimation error in Mode III 606 is zero due to negligible mutual flux effect in that mode.

Self-Inductance Estimation Error in Mode I

In Mode I, at positive-current-slope sampling point $t_{k\_on(I)}$ 635 and negative-current-slope sampling point $t_{k\_off(I)}$ 640 of $k^{th}$ phase, $(k-1)^{th}$ phase current slope is positive, at point 645, and negative, at point 650, respectively. Considering the mutual flux from $k^{th}$ phase, the $(k-1)^{th}$ phase voltage equation is derived as (18) and (19) at $t_{k\_on(I)}$ and $t_{k\_off(I)}$.

$$U_{dc} = Ri_{k-1} + L_{k-1,k-1}\frac{di_{k-1}(t_{k\_on(I)})}{dt} + \frac{\partial L_{k-1,k-1}}{\partial \theta}i_{k-1}\omega_m + M_{k,k-1}\frac{di_k(t_{k\_on(I)})}{dt} + \frac{\partial M_{k,k-1}}{\partial \theta}i_k\omega_m \quad (18)$$

$$-U_{dc} = Ri_{k-1} + L_{k-1,k-1}\frac{di_{k-1}(t_{k\_off(I)})}{dt} + \frac{\partial L_{k-1,k-1}}{\partial \theta}i_{k-1}\omega_m + M_{k,k-1}\frac{di_k(t_{k\_off(I)})}{dt} + \frac{\partial M_{k,k-1}}{\partial \theta}i_k\omega_m \quad (19)$$

The self-inductance estimation error due to mutual flux from $(k-1)^{th}$ in Mode I 602 can be derived from the following equations. Equation (20) is derived by subtracting equations (19) from (18). Equation (21) is derived by subtracting equations (14) by (15). Equation (22) is derived by subtracting equations (20) from (21).

$$K_{k-1,k-1}\left(\frac{di_{k-1}(t_{k\_on(I)})}{dt} - \frac{di_{k-1}(t_{k\_off(I)})}{dt}\right) + M_{k,k-1}\left(\frac{di_k(t_{k\_on(I)})}{dt} - \frac{di_k(t_{k\_off(I)})}{dt}\right) = 2U_{dc} \quad (20)$$

$$L_{k,k}\left(\frac{di_k(t_{k\_on(I)})}{dt} - \frac{di_k(t_{k\_off(I)})}{dt}\right) + M_{k,k-1}\left(\frac{di_{k-1}(t_{k\_on(I)})}{dt} - \frac{di_{k-1}(t_{k\_off(I)})}{dt}\right) = 2U_{dc} \quad (21)$$

$$\frac{di_k(t_{k\_on(I)})}{dt} - \frac{di_k(t_{k\_off(I)})}{dt} = \frac{L_{k-1,k-1} - M_{k,k-1}}{L_{k,k} - M_{k,k-1}}\left(\frac{di_{k-1}(t_{k\_on(I)})}{dt} - \frac{di_{k-1}(t_{k\_off(I)})}{dt}\right) \quad (22)$$

Equation (23) is derived by substituting (22) for (20) and represents the $(k-1)^{th}$ phase in Mode I 602.

$$\frac{di_{k-1}(t_{k\_on(I)})}{dt} - \frac{di_{k-1}(t_{k\_off(I)})}{dt} = \frac{2U_{dc}}{L_{k-1,k-1} + M_{k,k-1}\frac{L_{k-1,k-1} - M_{k,k-1}}{L_{k,k} - M_{k,k-1}}} \quad (23)$$

Equation (24) is derived by substituting (23) for (17) and represents the error of $k^{th}$ phase self-inductance estimation due to mutual flux from $(k-1)^{th}$ phase in Mode I.

$$err_{k(I)} = \frac{-M_{k,k-1}}{L_{k-1,k-1} + M_{k,k-1}\frac{(L_{k-1,k-1} - M_{k,k-1})}{(L_{k,k} - M_{k,k-1})} - M_{k,k-1}} \quad (24)$$

where $err_{k(I)}$ is $k^{th}$ phase self-inductance estimation error due to mutual flux from $(k-1)^{th}$ phase in Mode I 602.

Self-Inductance Estimation Error in Mode II

In Mode II 604, at positive-current-slope sampling point $t_{k\_on(II)}$ 625 and negative-current-slope sampling point $t_{k\_off(II)}$ 630 of $k^{th}$ phase, $(k-1)^{th}$ phase current slope is negative, at point 655, and positive, at point 660, respectively. Similar to mode I 602, equation (25) is derived for the $(k-1)^{th}$ phase $$L_{k-1,k-1}\left(\frac{di_{k-1}(t_{k\_off(II)})}{dt} - \frac{di_{k-1}(t_{k\_on(II)})}{dt}\right) + M_{k,k-1}\left(\frac{di_k(t_{k\_on(II)})}{dt} - \frac{di_k(t_{k\_off(II)})}{dt}\right) = 2U_{dc} \quad (25)$$

Similar to Mode I 602, the error of $k^{th}$ phase self-inductance estimation due to mutual flux from $(k-1)^{th}$ phase in Mode II 604 is calculated as (26).

$$err_{k(II)} = \frac{M_{k,k-1}}{L_{k-1,k-1} + M_{k,k-1}\frac{(L_{k-1,k-1} - M_{k,k-1})}{(L_{k,k} - M_{k,k-1})} - M_{k,k-1}} \quad (26)$$

where $err_{k(II)}$ is $k^{th}$ phase self-inductance estimation error due to mutual flux from $(k-1)^{th}$ phase in Mode II 604.

Self-Inductance Estimation Error in Mode III

In Mode III 606, at positive-current-slope sampling point $t_{k\_on(III)}$ 615 and negative-current-slope sampling point $t_{k\_off(III)}$ 620 of $k^{th}$ phase, $(k-1)^{th}$ phase current slope has the same sign, see points 665 and 670 on the positive slope of the $(k-1)^{th}$ phase current. By neglecting the inductance and back EMF variation, equation (27) is derived.

$$\frac{di_{k-1}(t_{k\_on(III)})}{dt} - \frac{di_{k-1}(t_{k\_off(III)})}{dt} = 0 \quad (27)$$

Substituting (27) for (17), error of $k^{th}$ phase self-inductance estimation due to mutual flux from $(k-1)^{th}$ phase in Mode III 606 is calculated as (28). The self-inductance estimation error is zero and therefore the mutual flux coupling effect on self-inductance estimation is eliminated.

$$err_{k(III)} = 0 \quad (28)$$

where $err_{k(III)}$ is $k^{th}$ phase self-inductance estimation error due to mutual flux from $(k-1)^{th}$ phase in Mode III 606.

Figure 7:
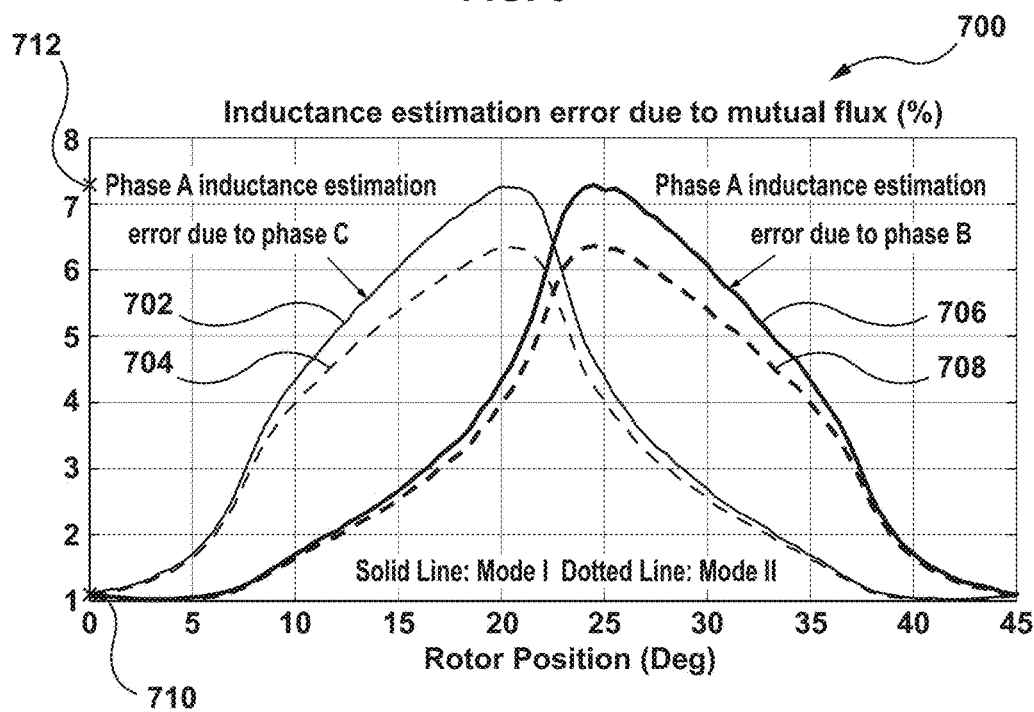
FIG. 7 illustrates the self-inductance estimation error of phase A due to mutual flux from phases B and C in a three-phase SRM according to an example embodiment.

Reference is next made to FIG. 7, which illustrates the graphical representation of self-inductance estimation error 700 of phase A due to mutual flux from phases B and C in a three-phase SRM according to an example embodiment.

Graph 702 illustrates a graphical representation of absolute values of self-inductance estimation error of phase A due to mutual flux from phase C in Mode I, such as Mode I 602 of FIG. 6. Graph 704 illustrates a graphical representation of absolute values of self-inductance estimation error of phase A due to mutual flux from C in Mode II, such as Mode II 604 of FIG. 6.

Graph 706 illustrates a graphical representation of absolute values of self-inductance estimation error of phase A due to mutual flux from phase B in Mode I, such as Mode I 602 of FIG. 6. Graph 708 illustrates the absolute values of self-inductance estimation error of phase A due to mutual flux from phase B in Mode II, such as Mode II 604 of FIG. 6.

As illustrated in FIG. 7, phase A self-inductance estimation error due to mutual flux from phase B and phase C is rotor position dependent. The mutual flux introduces a maximum error around 7% 712 and minimum error around 1% 710 to the phase A self-inductance estimation in Modes I and II. In Mode III, the mutual flux introduces 0% self-inductance estimation error.

The Self-Inductance Estimation to Eliminate Mutual Flux Effect

The various embodiments described herein are based on excluding modes of operation corresponding to Modes I and II, such as Modes I 602 and II 604 of FIG. 6, and accordingly eliminating the error in self-inductance estimation due to the mutual flux. As illustrated in FIG. 7, the mutual flux introduces a maximum ±7% self-inductance estimation error in Mode I and II, while the mutual flux effect does not exist in Mode III.

Various embodiments disclosed herein relate to adjusting the mode of operation of the switched reluctance motor to a desired mode, such as Mode III 606 of FIG. 6, where the impact of mutual flux on estimation of self-inductances does not exist. In the various embodiments disclosed here, the mode of operation of the switched reluctance motor is controlled by applying variable-hysteresis-band current control method for the incoming-phase self-inductance estimation and variable-sampling method for the outgoing-phase self-inductance estimation.

In the variable-hysteresis-band current control method, when estimating the self-inductance of the incoming phase, the variation in the switching states of the outgoing phase is avoided and the hysteresis band of the outgoing phase is adjusted.

In some cases, when the variable-hysteresis-band current control method is applied to the outgoing-phase self-inductance estimation, undesirable higher current ripples may be observed in the incoming phase. In such cases, variable-sampling method for the outgoing-phase self-inductance estimation is applied to overcome the drawback of variable-hysteresis-band current control method when applied to the outgoing-phase.

Variable-Hysteresis-Band Current Control for Incoming Phase

Figure 8:
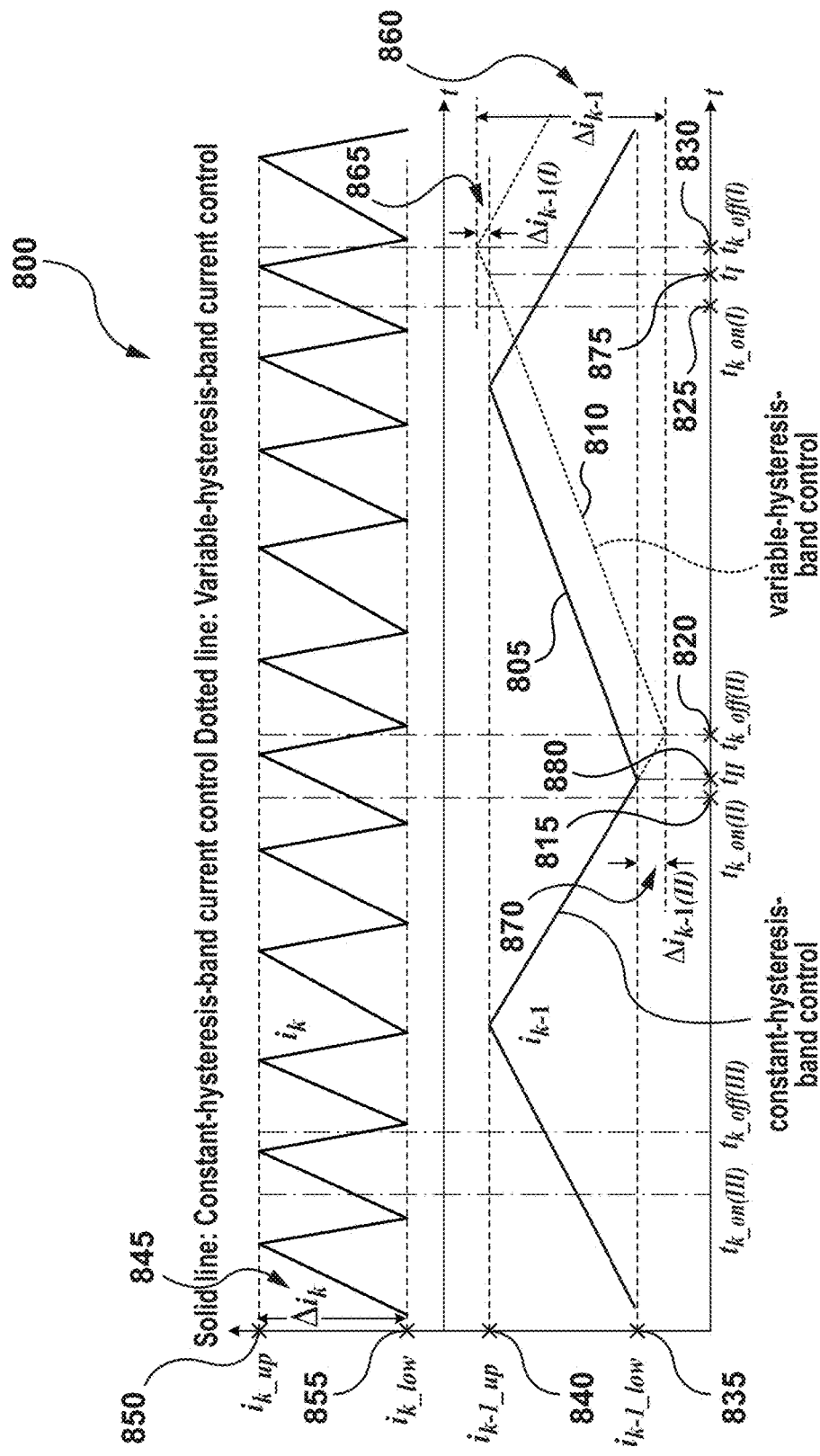
FIG. 8 illustrates a graphical representation of a variable-hysteresis-band current controller according to an example embodiment.

Reference is next made to FIG. 8, which illustrates the application of variable-hysteresis-band current control 800 during the $k^{th}$ phase self-inductance estimation. As illustrated, during commutation, the $k^{th}$ phase current slope is much higher than that of $(k-1)^{th}$ because of lower self-inductance of $k^{th}$ phase. The $(k-1)^{th}$ phase current profiles with constant-hysteresis-band control and proposed variable-hysteresis-band control are illustrated as graphs 805 and 810, respectively.

The variable-hysteresis-band current control method allows the switching state of $(k-1)^{th}$ phase to be unchanged during the time intervals $t_{k\_on(II)}$ 815-$t_{k\_off(II)}$ 820 and $t_{k\_on(I)}$ 825-$t_{k\_off(I)}$ 830. When the self-inductance estimation of $k^{th}$ phase is completed at $t_{k\_off(II)}$ 820 and $t_{k\_off(I)}$ 830, switches of $(k-1)^{th}$ phase are turned off or on according to the error between $(k-1)^{th}$ phase current and its reference.

As illustrated, when $(k-1)^{th}$ phase current at $t_{k\_off(I)}$ 830 or $t_{k\_off(II)}$ 820 is lower than its lower reference $i_{k-1\_low}$ 835, switches are turned on. When $(k-1)^{th}$ phase current $t_{k\_off(I)}$ 830 or $t_{k\_off(II)}$ 820 is higher than its lower reference $i_{k-1\_up}$ 840, switches are turned off. Since the sign of $(k-1)^{th}$ phase current remains unchanged during the sampling interval, the $k^{th}$ phase self-inductance estimation is working in Mode III and mutual flux effect on self-inductance estimation is eliminated.

As illustrated, hysteresis band for $k^{th}$ phase current control ($\Delta i_k$) 845 stays constant. Its upper and lower reference is denoted as $i_{k\_up}$ 850 and $i_{k\_low}$ 855, respectively. However, in order to keep the switching state of $(k-1)^{th}$ phase unchanged during the $k^{th}$ phase self-inductance estimation, the hysteresis-band of $(k-1)^{th}$ phase ($\Delta i_{k-1}$) 860 varies with time. The hysteresis band of $(k-1)^{th}$ phase ($\Delta i_{k-1}$) 860 is represented as (29).

$$\Delta i_{k-1} = (i_{k-1\_up} + \Delta i_{k-1(I)}) - (i_{k-1\_low} - \Delta i_{k-1(II)}) \quad (29)$$

where $\Delta i_{k-1(I)}$ 865 and $\Delta i_{k-1(II)}$ 870 are the adjusted hysteresis band of $(k-1)^{th}$ current in Mode I and Mode II during $k^{th}$ phase self-inductance estimation, respectively.

As illustrated in FIG. 8, the variable-hysteresis-band current control increases the hysteresis band, which introduces more current ripples. The adjusted hysteresis band of $\Delta i_{k-1(I)}$ 865 and $\Delta i_{k-1(II)}$ 870 varies with time. At time instants $t_I$ 875 and $t_{II}$ 880, the $(k-1)^{th}$ phase current reaches its upper and lower reference. Neglecting the mutual flux from $k^{th}$ phase, the $(k-1)^{th}$ phase voltages during the intervals $t_I$ 875-$t_{k\_off(I)}$ 830 are derived as (30).

$$U_{dc} = Ri_{k-1} + L_{k-1,k-1}\frac{\Delta i_{k-1(I)}}{t_{k\_off(I)}-t_I} + \frac{\partial L_{k-1,k-1}}{\partial \theta}i_{k-1}\omega_m \tag{30}$$

The adjusted hysteresis band for Mode I is derived as (31) according to (30)

$$\Delta i_{k-1(I)} = \frac{\left(U_{dc} - Ri_{k-1} - \frac{\partial L_{k-1,k-1}}{\partial \theta}i_{k-1}\omega_m\right)(t_{k\_off(I)} - t_1)}{L_{k-1,k-1}} \tag{31}$$

In various embodiments, in order to obtain the range of the adjusted hysteresis band, the range of back EMF is obtained first. In current control mode, the back EMF of SRM cannot exceed the DC-link voltage, equation (32) has to be satisfied.

$$-U_{dc} \leq \frac{\partial L_{k-1,k-1}}{\partial \theta}i_{k-1}\omega_m \leq U_{dc} \tag{32}$$

Considering the maximum possible back-EMF in (32) and the resistive voltage drop, equation (33) has to be satisfied.

$$U_{dc} - Ri_{k-1} - \frac{\partial L_{k-1,k-1}}{\partial \theta}i_{k-1}\omega_m \leq$$
$$U_{dc} - \frac{\partial L_{k-1,k-1}}{\partial \theta}i_{k-1}\omega_m \leq U_{dc} + U_{dc} \tag{33}$$

As illustrated in FIG. 8, time intervals have to meet the constraints of equation (34).

$$t_{k\_off(I)} - t_I \leq t_{k\_off(I)} - t_{k\_on(I)} \tag{34}$$

Based on equations (31), (33) and (34), the adjusted hysteresis band for Mode I must satisfy (35).

$$\Delta i_{k-1(I)} = \frac{\left(U_{dc} - Ri_{k-1} - \frac{\partial L_{k-1,k-1}}{\partial \theta}i_{k-1}\omega_m\right)(t_{k\_off(I)} - t_1)}{L_{k-1,k-1}} \leq$$
$$\frac{2U_{dc}(t_{k\_off(I)} - t_{k\_on(I)})}{L_{k-1,k-1}} \tag{35}$$

Therefore, the maximum adjusted hysteresis band of the outgoing phase in Mode I is derived as equation (36).

$$\Delta i_{k-1(I)}^{max} = \frac{2U_{dc}t_{sample}}{L_{k-1,k-1}} \tag{36}$$

where the required sample time is represented as $t_{sample}=t_{k\_off(I)}-t_{k\_on(I)}$.

Similar to Mode I, the maximum adjusted hysteresis band in Mode II has the same expression as equation (36). With the same sampling time $t_{sample}$ in Mode I and II, the maximum adjusted hysteresis band in Mode I and Mode II is the same. The maximum adjusted hysteresis band is a function of self-inductance. During commutation, the $(k-1)^{th}$ phase (outgoing phase) self-inductance $L_{k-1,k-1}$ is close to aligned inductance $L_a$. Therefore, the maximum adjusted hysteresis band is approximated as (37).

$$\Delta i_{k-1}^{max} = \frac{2U_{dc}t_{sample}}{L_a} \tag{37}$$

Figure 9:
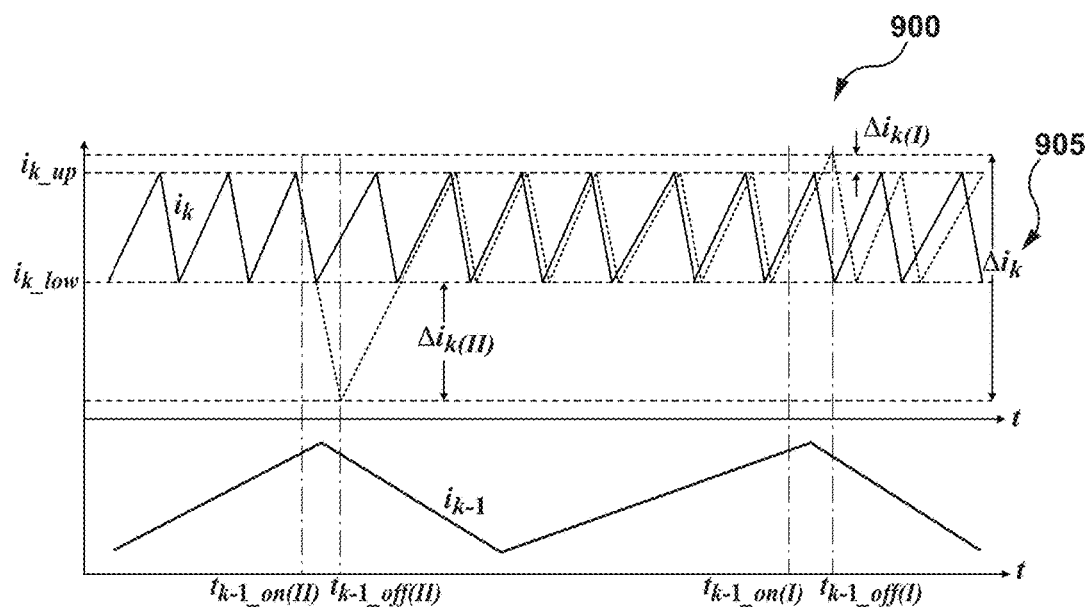
FIG. 9 illustrates a graphical representation of a variable-hysteresis-band phase current control for outgoing phase, (k−1), according to an example embodiment.

Reference is next made to FIG. 9, which illustrates a graphical representation 900 of application of a variable-hysteresis-band current control for $(k-1)^{th}$ phase according to an example embodiment. During commutation, the $k^{th}$ phase self-inductance $L_{k,k}$ is close to unaligned inductance $L_u$ and the maximum adjusted hysteresis band is represented as (38).

$$\Delta i_k^{max} = \frac{2U_{dc}t_{sample}}{L_u} \tag{38}$$

Since the unaligned inductance is much smaller than the aligned inductance $L_a$, the adjusted hysteresis band during $(k-1)^{th}$ phase self-inductance estimation is much higher than that during $k^{th}$ phase self-inductance estimation. As illustrated in FIG. 9, the hysteresis band of the $k^{th}$ phase 905 is modified as (39) by applying variable-hysteresis-band current control.

$$\Delta i_k = (i_{k\_up} + \Delta i_{k(I)}) - (i_{k\_low} - \Delta i_{k(II)}) \tag{39}$$

In the illustrated embodiment, the variable-hysteresis-band current control for outgoing phase self-inductance estimation has the drawback of high current ripples and torque ripples. In order to overcome the drawback of this method, as illustrated in FIG. 10, a variable-sampling method is used for the outgoing-phase self-inductance estimation.

Figure 10:
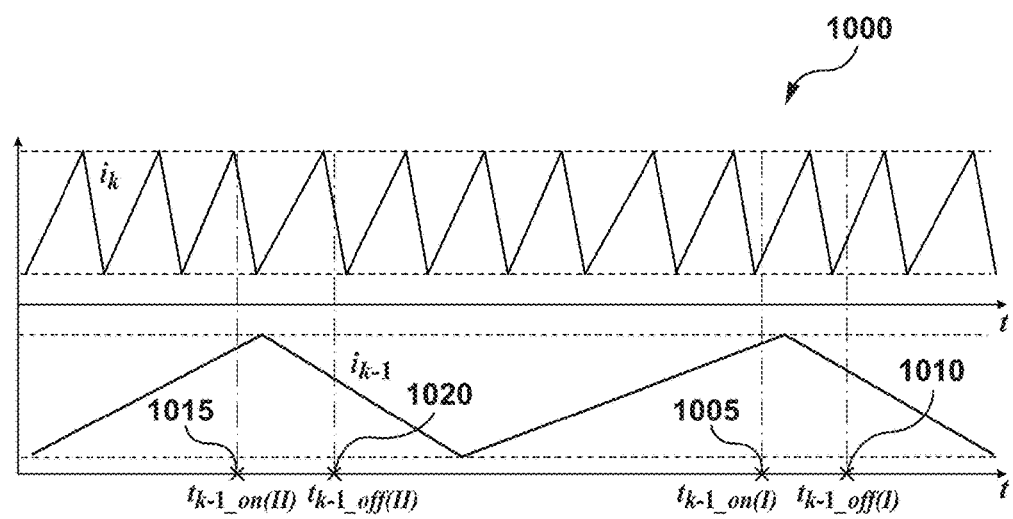
FIG. 10 illustrates a graphical representation of self-inductance estimation of $(k-1)^{th}$ phase using variable-sampling method according to an example embodiment.

Reference is accordingly made to FIG. 10, which illustrates a graphical representation of self-inductance determination of $(k-1)^{th}$ phase 1000 using variable-sampling method according to an example embodiment. In the illustrated embodiment, the positive phase current slope of $(k-1)^{th}$ phase is sampled at time instants $t_{k-1\_on(I)}$ 1005 and $t_{k-1\_on(II)}$ 1015, which are fixed. Since the phase current slope of $(k-1)^{th}$ phase is much lower than $k^{th}$ phase, the sign of $k^{th}$ phase current slope is changed several times during $(k-1)^{th}$ phase self-inductance estimation.

As illustrated, in Mode I, the $(k-1)^{th}$ phase negative-phase-current-slope sampling point $t_{k-1\_off(I)}$ 1010 is adjusted to ensure $k^{th}$ phase current slopes at $t_{k-1\_off(I)}$ 1010 and $t_{k-1\_on(I)}$ 1005 have the same signs. An analogous method is applied to Mode II so that the $k^{th}$ phase current slopes at $t_{k-1\_off(II)}$ 1020 and $t_{k-1\_on(II)}$ 1015 have the same sign.

In the illustrated embodiment, the outgoing-phase (k-1) self-inductance estimation is always operating in Mode III, and therefore mutual flux from $k^{th}$ phase is eliminated. Since the phase current slope of $k^{th}$ phase (incoming phase) is much higher than $(k-1)^{th}$ phase, the sign of $(k-1)^{th}$ phase current slope is changed only once or not changed.

Rotor Position Estimation at Rotating Shaft Conditions

Once the self-inductance of a phase is estimated, rotor position is obtained based on the inductance-rotor position characteristics. In the various embodiments illustrated herein, the phase self-inductance is estimated only in the active region by using the phase current slope difference at rotating shaft condition. Therefore, for a three-phase SRM, each phase takes up one third of rotor period and three-phase inductance estimation covers the total rotor period.

Figure 11A:
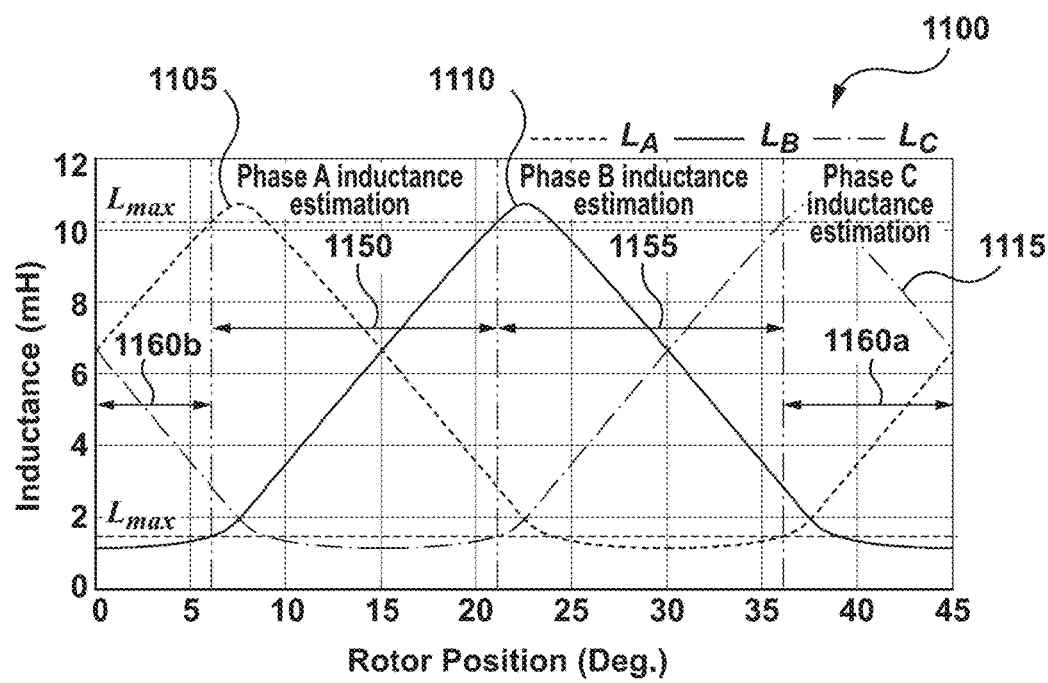
FIG. 11A illustrates a graphical representation of classification of the phase self-inductance estimation regions according to an example embodiment.

Reference is made to FIG. 11A, which illustrates a graphical representation 1100 of classification of the phase self-inductance estimation regions according to an example embodiment. Graph 1105 illustrates the self-inductance of phase C as a function of rotor position. Graph 1110 illustrates the self-inductance of phase A as a function of rotor position. Graph 1115 illustrates the self-inductance of phase B as a function of rotor position. As illustrated, self-inductance estimation is classified into phase A, B and C self-inductance estimation. Phase A self-inductance estimation region 1150, phase B self-inductance estimation region 1155 and phase C self-induction estimation regions 1160*a* and 1160*b* are selected to avoid the inductance estimation near unaligned rotor position. This is because, near unaligned position, the change of phase self-inductance with rotor position is relatively low and, therefore, slight error in inductance estimation may lead to a much higher error in rotor position estimation.

The rotor position is estimated based on the corresponding phase self-inductance estimation region. When the estimated inductance of a phase reaches the maximum value, the self-inductance estimation is transferred to the next region. For example, when phase A self-inductance estimation region 1150 is selected, estimated phase A self-inductance is converted to the rotor position at each switching period by using rotor position-inductance characteristics. Once the estimated phase A inductance reaches $L_{max}$, phase inductance estimation is changed from phase A self-inductance estimation region 1150 to phase B self-inductance estimation region 1155. The phase B self-inductance is estimated next and rotor position is updated based on estimated phase B self-inductance.

In the various embodiments illustrated herein, linear torque sharing function is used for instantaneous torque control of SRM. The torque reference of km phase (incoming phase) and (k−1)$^{th}$ phase (outgoing phase) defined by linear TSF are expressed as (40) and (41).

$$T_k = \frac{T_{ref}}{\theta_{ov}}(\theta - \theta_n) \quad (40)$$

$$T_{k-1} = T_{ref} - \frac{T_{ref}}{\theta_{ov}}(\theta - \theta_{off}) \quad (41)$$

where $T_k$ and $T_{k-1}$ is the torque reference for the incoming phase and outgoing phase, respectively; $T_{ref}$ is the total torque reference. $\theta_{on}$, $\theta_{off}$ and $\theta_{ov}$ are the turn-on angle, turn-off angle and overlapping angle, respectively.

Figure 11B:
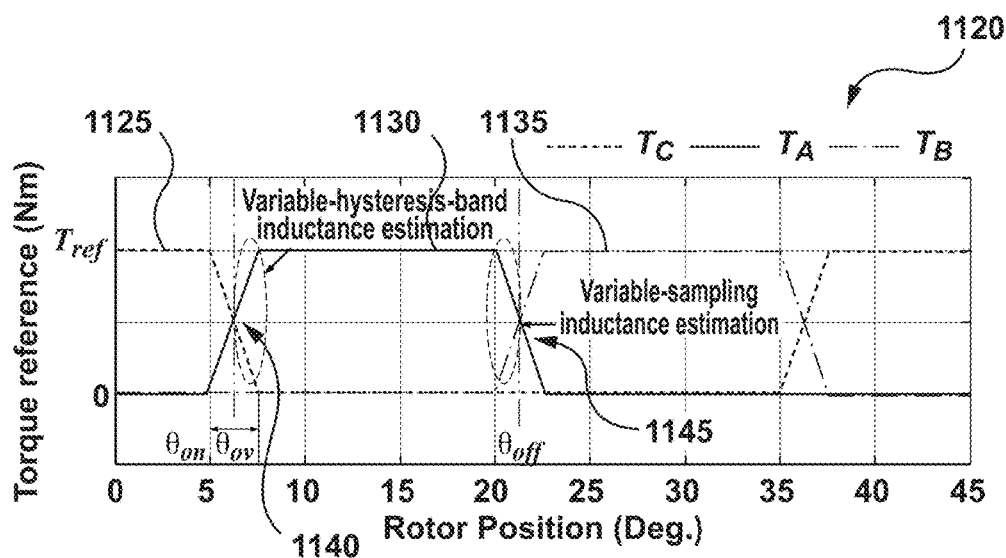
FIG. 11B illustrates a graphical representation of torque references of the three phases of a three-phase SRM using a linear torque sharing function according to an example embodiment.

Reference is next made to FIG. 11B, which illustrates a graphical representation of torque references of the three phases of a three-phase SRM using a linear torque sharing function 1120 according to an example embodiment. Graph 1130 illustrates the torque reference of phase A as a function of rotor position. Graph 1135 illustrates the torque reference of phase B as a function of rotor position. Graph 1125 illustrates the torque reference of phase C as a function of rotor position.

In the various embodiments illustrated herein, the variable-hysteresis-band current control method is applied during the incoming phase self-inductance estimation, while variable-sampling phase-inductance estimation method is applied during the outgoing phase self-inductance estimation. Each phase self-inductance estimation region, such as phase A inductance estimation region 1150, phase B inductance estimation region 1155 or phase C inductance estimation region 1160*a* and 1160*b*, includes both incoming phase self-inductance estimation 1140 and outgoing phase self-inductance estimation 1145, and therefore both the variable-hysteresis-band current control method and variable-sampling phase-inductance estimation method are applied in each self-inductance estimation region.

Figure 12C:
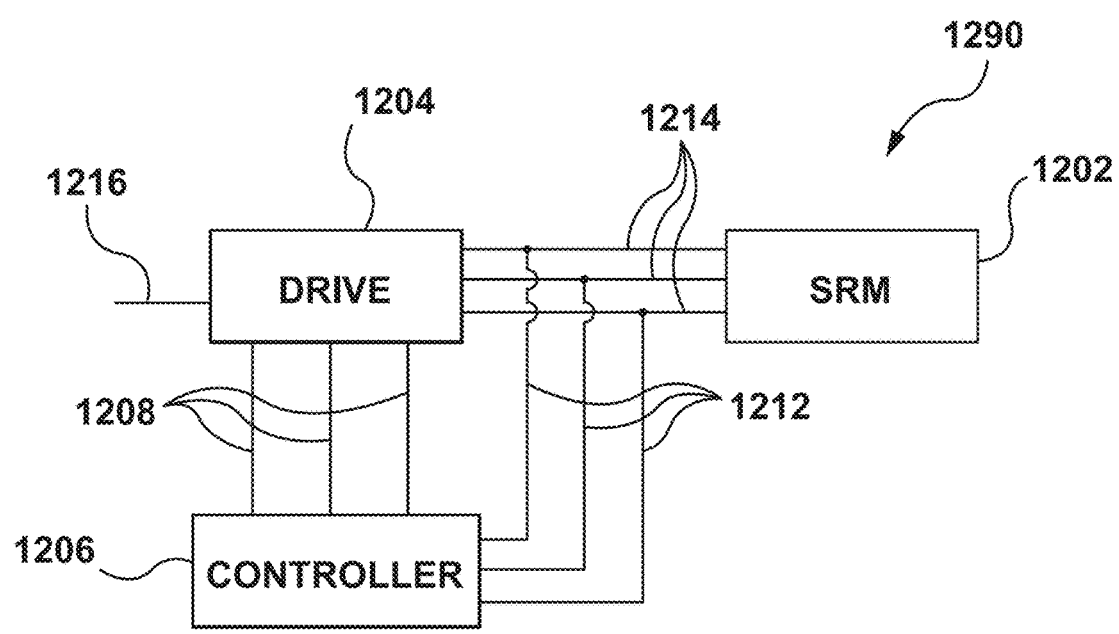
FIG. 12C illustrates a block diagram of a rotor position determination system according to an example embodiment.

Reference is briefly made to FIG. 12C, which illustrates a block diagram of a rotor position determination system 1290 according to an example embodiment. Block diagram of the rotor position determination system 1290 includes a switched reluctance motor 1202, a drive 1204 and a controller 1206.

Switched reluctance motor 1202 converts reluctance torque into mechanical power. Switched reluctance motor 1202 includes a stator defining a plurality of stator poles and a rotor defining a plurality of rotor poles. In various embodiments discussed herein, the stator of the switched reluctance motor 1202 has coils wound around the plurality of stator poles, whereas the rotor has no magnets or coils attached to the rotor poles. The coils wound around the stator poles are arranged uniquely to define phases and energized in a sequence to operate the switched reluctance motor 1202.

When the switched reluctance motor 1202 is in operation, drive 1204 switches electric power from line 1216 onto each phase line 1214 based on control signals 1208 received from controller 1206. Phase lines 1214 conduct electrical power between drive 1204 and each phase of the switched reluctance motor 1202.

Controller 1206 may be a programmable logic controller (PLC), a microcontroller or any other circuit assembly that can be used to enable a precise control of the operation of the switched reluctance motor 1202. Controller 1206 is configured to receive as inputs 1212 at least one sensed operating parameter from switched reluctance motor 1202. This may include one or more of phase voltages and phase currents. The operating parameters may be measured using sensors.

Controller 1206 is further configured to generate control signals 1208 for drive 1204. The control signals may be generated based on sensed operating parameter(s) and/or mathematical model based on known and/or sensed parameter(s). In at least one embodiment, the drive 1204 is analogous to drives 500 and 500' illustrated in FIGS. 5A and 5B respectively.

In the various embodiments illustrated herein, the controller 1206 is configured to operate the switched reluctance motor in an error reduction mode. In the error reduction mode, the error resulting in the self-inductance estimation of a first phase of the switched reluctance motor due to mutual flux from a second phase of the switched reluctance motor is reduced. In some cases, the error is reduced to a near zero value. Simulation and experimental results discussed below also illustrate that the error is reduced in the error reduction mode operation of the switched reluctance motor. In some cases, the reduction of error to a near zero value results in elimination of any noticeable mutual flux effect on the self-inductance estimation of phases.

In various embodiments illustrated herein, in the error reduction mode, when a positive slope of a phase current corresponding to a first phase of the switched reluctance motor is sampled at a first sample time and when a negative slope of the phase current corresponding to the first phase of the switched reluctance motor is sampled at a second sample time, the slopes of a phase current corresponding to a second phase of the switched reluctance motor have the same sign at the first sample time and the second sample time.

In at least one embodiment, if the first phase of the switched reluctance motor is an incoming phase, the controller 1206 is configured to operate the switched reluctance motor in the error reduction mode by controlling the switching state of the phase current of an outgoing phase so that the phase current of the outgoing phase remains unchanged between the first sample time and the second sample time.

In at least one embodiment, if the first phase of the switched reluctance motor is an outgoing phase, the controller is configured to operate the switched reluctance motor in the error reduction mode by adjusting the second sample time to a new second sample time, so that at the new second sample time, the outgoing phase is sampled at the negative slope of the corresponding phase current, and the phase current corresponding to an incoming phase of the switched reluctance motor has the same sign as the sign of the slope of the incoming phase current at the first sample time.

Reference is next made to FIG. 12A, which illustrates an example embodiment of a variable-hysteresis-band current control estimation method 1200 in accordance with the teachings herein. The method 1200 is carried out by any controller coupled to the switched reluctance motor, such as controller 1206 of FIG. 12C.

The method starts at 1205. At 1210, it is determined if the derivative of the incoming phase current is greater than zero. If the derivative of the incoming phase current is not determined to be greater than zero, the method continues to monitor when the derivative of the incoming phase current becomes greater than zero.

If the derivative of the incoming phase current is determined to be greater than zero, at 1215, the positive incoming phase current slope is obtained and the hysteresis controller of the outgoing phase is disabled. The hysteresis controller of the outgoing phase stays disabled until it is determined at 1220 that the derivative of the incoming phase current is less than zero.

Once the derivative of the incoming phase current is determined to be less than zero, at 1225, the negative incoming phase current slope is obtained and the inductance of the incoming phase is estimated. At 1230, the hysteresis controller of the outgoing phase is enabled and the method ends at 1235.

As illustrated in FIG. 12A, in order to ensure that the sign of the outgoing-phase current slope is unchanged during the incoming-phase self-inductance estimation, the outgoing phase current controller is disabled and enabled after the incoming-phase self-inductance estimation is finished.

Reference is made to FIG. 12B, which illustrates an example embodiment of a variable-sampling method 1250 in accordance with the teachings herein. The method 1250 is carried out by any controller coupled to a switched reluctance motor, such as controller 1206 of FIG. 12C.

The method starts at 1255. At 1260, it is determined if the derivative of the outgoing phase current is greater than zero. If the derivative of the outgoing phase current is not determined to be greater than zero, the method continues to monitor when the derivative of the outgoing phase current becomes greater than zero.

If the derivative of the outgoing phase current is determined to be greater than zero, at 1265, the positive outgoing phase current slope is obtained and the sign of the incoming phase current slope is determined and stored. This process continues until it is determined at 1270 that the derivative of the outgoing phase current is less than zero.

Once the derivative of the outgoing phase current is determined to be less than zero, at 1275, it is determined if the sign of the derivative of the incoming phase is the same as the previously-stored sign of the incoming phase current slope. If the sign of the derivative of the incoming phase is not the same as the previously-stored sign of the incoming phase current slope, the method continues to monitor when the sign of the derivative of the incoming phase is equal to the previously-stored sign of the incoming phase current slope.

If the sign of the derivative of the incoming phase is determined to be the same as the previously-stored sign of the incoming phase current slope, at 1280, the negative outgoing phase current slope is obtained and the inductance of the outgoing phase is estimated. The method ends at 1285.

Figure 13:
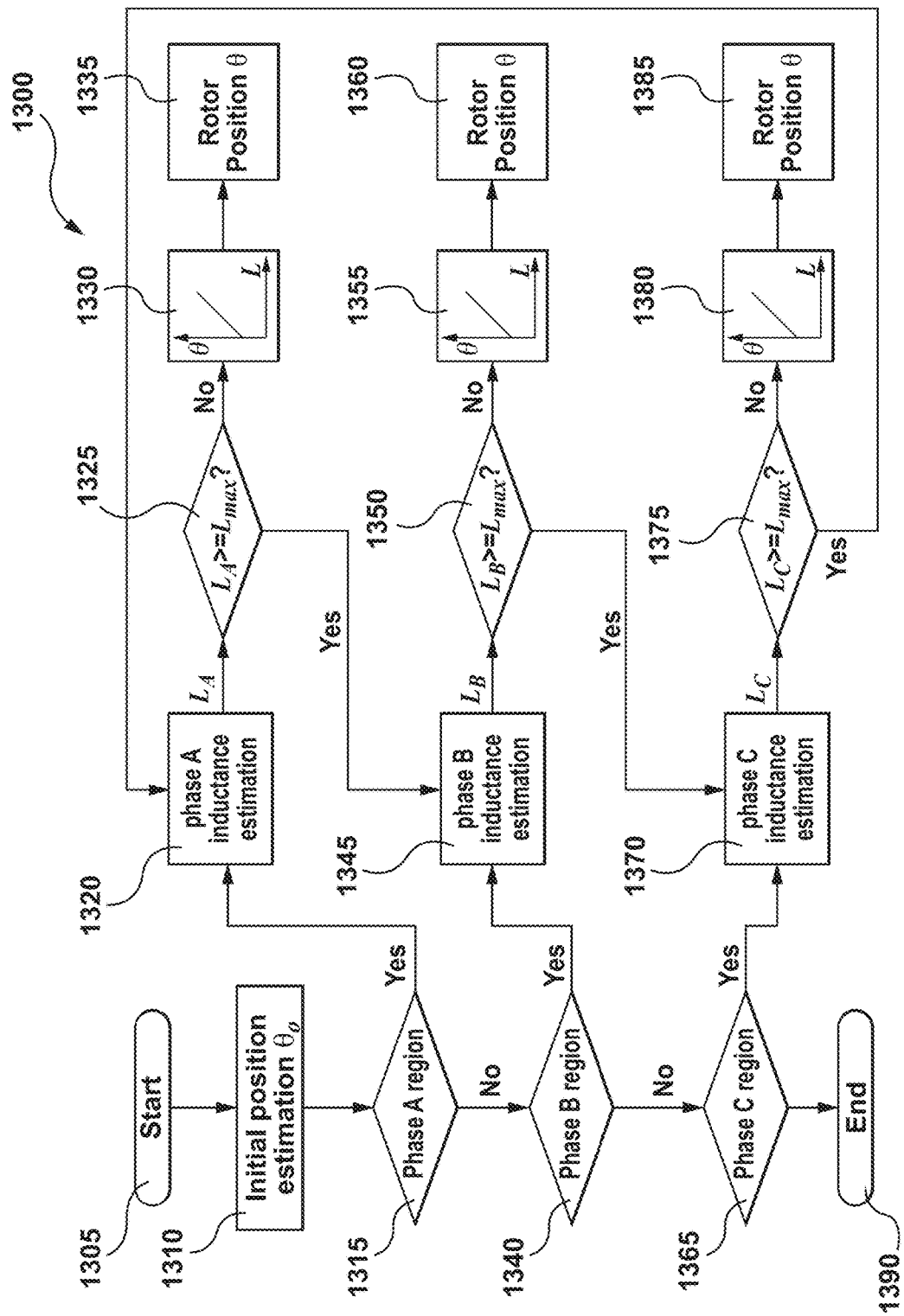
FIG. 13 illustrates a flowchart of a rotor position determination method at standstill and rotating shaft conditions according to an example embodiment.

Reference is made to FIG. 13, which illustrates an example embodiment of a rotor position estimation method 1300 in accordance with the teachings herein. The rotor position estimation method 1300 method applies to rotor position estimation at standstill and rotating shaft condition. The method 1300 is carried out by any controller coupled to a switched reluctance motor, such as controller 1206 of FIG. 12C.

The method starts at 1305. At 1310, an initial rotor position $\theta_o$ is estimated. At 1315, it is determined if the self-inductance estimation method is operating in phase A inductance estimation region. If the self-inductance estimation method is not determined to operate in phase A inductance estimation region, at 1340, it is determined if the self-inductance estimation method is operating in phase B inductance estimation region.

If the self-inductance estimation method is operating in phase A inductance estimation region, at 1320, phase A self-inductance, $L_a$, is estimated. Once the phase A self-inductance, $L_a$, is estimated, at 1325, it is determined if phase A inductance, $L_a$, is greater than or equal to maximum inductance, $L_{max}$.

If it is determined that phase A self-inductance, $L_a$, is not greater than or equal to the maximum inductance, $L_{max}$, at 1330, phase A self-inductance is converted into rotor position and at 1335, rotor position is updated.

If it is determined that phase A self-inductance, $L_a$, is greater than or equal to the maximum inductance, $L_{max}$, at 1345, phase B self-inductance, $L_b$, is estimated. Similarly, if, at 1340, the self-inductance estimation method is determined to be operating in phase B inductance estimation region, at 1345, phase B self-inductance, $L_b$, is estimated.

If, at 1340, the self-inductance estimation method is determined to not operate in phase B inductance estimation region, at 1365, it is determined if the self-inductance estimation method is operating in phase C inductance estimation region.

Once the phase B inductance, $L_b$, is estimated, at 1350, it is determined if phase B inductance, $L_b$, is greater than or equal to maximum inductance, $L_{max}$. If it is determined that maximum inductance, $L_{max}$, is not greater than or equal to phase B inductance, $L_b$, at 1355, estimated phase B self-inductance is converted into rotor position and at 1360, rotor position is updated.

If it is determined that phase B self-inductance, $L_b$, is greater than or equal to the maximum inductance, $L_{max}$, at 1370, phase C self-inductance, $L_c$, is estimated. Similarly, if, at 1365, the self-inductance estimation method is determined to be operating in phase C inductance estimation region, at 1370, phase C inductance is estimated.

Once the phase C inductance, $L_c$, is estimated, at 1375, it is determined if phase C inductance, $L_c$, is greater than or equal to maximum inductance, $L_{max}$. If it is determined that phase C inductance, $L_c$, is not greater than or equal to maximum inductance, $L_{max}$, at 1380, estimated phase C self-inductance is converted into rotor position and at 1385, rotor position is updated.

If it is determined that phase C inductance, $L_c$, is greater than or equal to maximum inductance, $L_{max}$, the method continues at 1320 where phase A self-inductance, $L_a$, is estimated.

If, at 1365, the self-inductance estimation method is determined to not be operating in phase C inductance estimation region, the method ends at 1390.

Reference is next made to FIGS. 14A-14F, 15A-15F, 16A-16E, 17A-17E, 18A-18E, 19A-19E, 20A-20F, 21A-21F, 22A-22F and 23A-23F, which illustrate graphical representations of simulation results of rotor position estimation according to the various embodiments illustrated herein. The graphical representations are based on a 2.3 kW, 6000 rpm, three-phase 12/8 SRM with a DC-link voltage of 300V. Linear TSF is used to generate the current reference for each phase. For the purposes of the graphical representation, the turn-on angle $\theta_{on}$, turn-off angle $\theta_{off}$ and overlapping angle $\theta_{ov}$ of linear TSF are set to 5°, 20° and 2.5°, respectively, where the angles are expressed in mechanical degrees. Furthermore, the sampling time $t_{sample}$ is set to 5μs and the maximum adjusted hysteresis band is approximately 0.27 A. Hysteresis control is used to control the phase current, and the current hysteresis band is set to be 0.5 A. In the various embodiments illustrated herein, the inductance and hence, the rotor position is estimated at each switching period. Due to the hysteresis controller, switching period varies during the conduction period of a phase.

Reference is first made to FIGS. 14A-14F, which illustrate graphical representations of simulation results of phase current, inductance, inductance estimation error, rotor position, rotor position estimation error and real-time rotor position estimation error for the SRM without variable-hysteresis-band and variable-sampling. For the simulation illustrated in FIGS. 14A-14F, the reference torque, $T_{ref}$ is set at 0.375 Nm and speed at 1200 rpm.

Figure 14A:
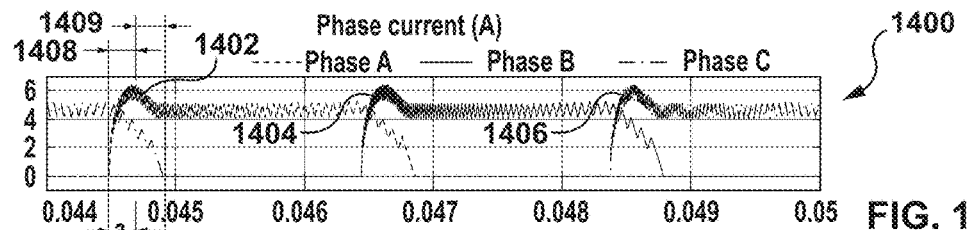
FIG. 14A illustrates a graphical representation of simulation results of phase currents of a three-phase SRM according to an example embodiment.

FIG. 14A illustrates the graphical representation of simulation results of phase currents 1400 of the three-phase 12/8 SRM as a function of time. Graph 1402 illustrates the phase current of phase A as a function of time. Graph 1404 illustrates the phase current of phase B as a function of time. Graph 1406 illustrates the phase current of phase C as a function of time.

Figure 14B:
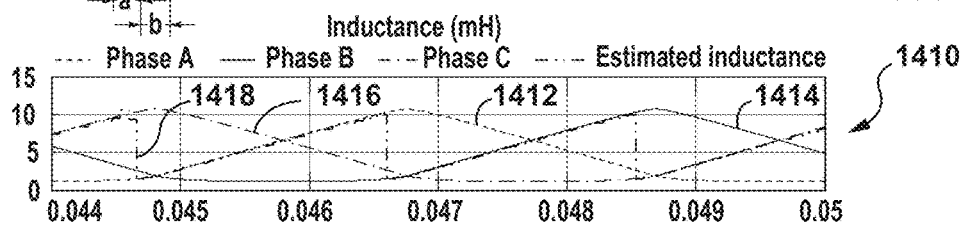
FIG. 14B illustrates a graphical representation of simulation results of inductance of each phase of a three-phase SRM according to an example embodiment.

FIG. 14B illustrates the graphical representation of simulation results of inductance 1410 as a function of time. Graph 1412 illustrates the inductance of phase A as a function of time. Graph 1414 illustrates the inductance of phase B as a function of time. Graph 1416 illustrates the inductance of phase C as a function of time. Graph 1418 illustrates the estimated inductance as a function of time.

Figure 14C:
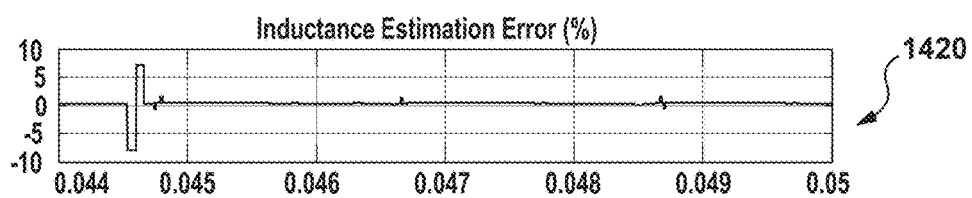
FIG. 14C illustrates a graphical representation of inductance estimation error of a three-phase SRM according to an example embodiment.

FIG. 14C illustrates the graphical representation of inductance estimation error 1420 as a function of time. In the various embodiments illustrated herein, the inductance estimation error as a function of time is denoted as equation (42).

$$err_L = \frac{L_{real} - L_e}{L_{real}} \qquad (42)$$

where $L_{real}$ and $L_e$ are real inductance and estimated inductance.

Figure 14D:
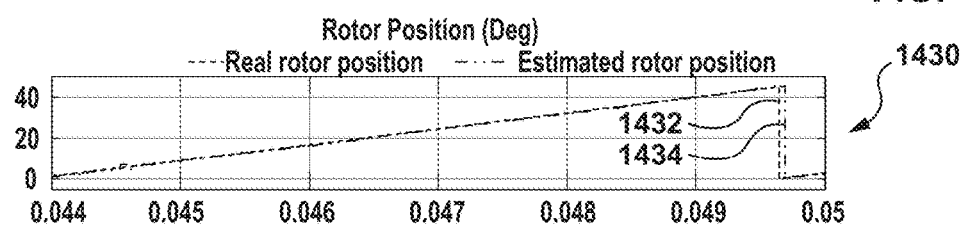
FIG. 14D illustrates a graphical representation of rotor position of a three-phase SRM according to an example embodiment.

FIG. 14D illustrates the graphical representation of rotor positions 1430 as a function of time. Graph 1432 illustrates the real rotor position as a function of time. Graph 1434 illustrates the estimated rotor position as a function of time.

Figure 14E:
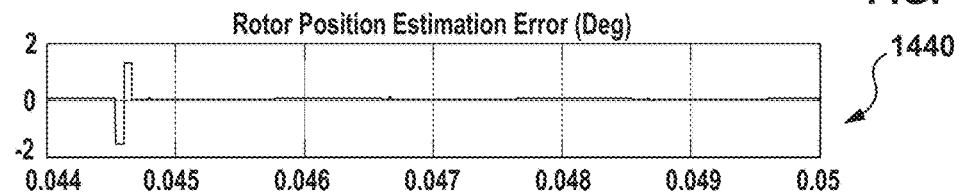
FIG. 14E illustrates a graphical representation of rotor position error of a three-phase SRM according to an example embodiment.

FIG. 14E illustrates the graphical representation of rotor position estimation error 1440 as a function of time. In the various embodiments illustrated herein, the rotor position estimation error as a function of time is denoted as equation (43). The graphical representation of the rotor position estimation error 1440 represents the difference between estimated rotor position and real rotor position when sampled at the switching frequency.

$$err_\theta = \theta_{real} - \theta_e \qquad (43)$$

where $\theta_{real}$ and $\theta_e$ are real rotor position and estimated rotor position, respectively.

Figure 14F:
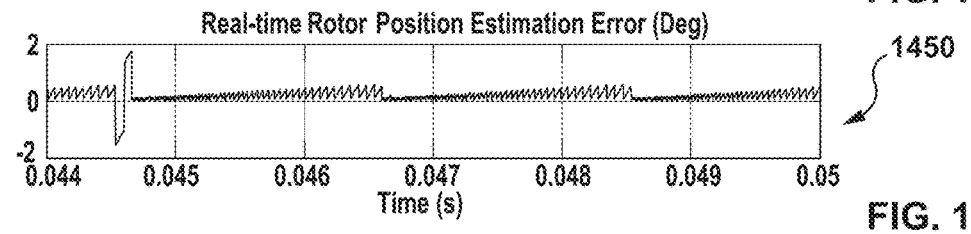
FIG. 14F illustrates a graphical representation of real-time rotor position determination error of a three-phase SRM according to an example embodiment.

FIG. 14F illustrates the graphical representation of real-time rotor position estimation error 1450 as a function of time. As illustrated in the various embodiments herein, the graphical representation of the rotor position estimation error represents the difference between estimated rotor position and real rotor position when sampled at the switching frequency. However, the real rotor position may be obtained by using a position sensor with a constant and much faster sampling. Accordingly, the real rotor position may be updated faster than estimated rotor position. This difference between estimated rotor position at switching frequency and the measured rotor position at a constant and higher sampling frequency is illustrated by the graphical representation of the real-time rotor position estimation error, such as graph 1450. As illustrated in FIGS. 14E and 14F, the real-time rotor position estimation error 1450 is updated faster than rotor position estimation error 1440.

Reference is next made to FIGS. 15A-15F, which illustrate graphical representations of simulation results of phase current, inductance, inductance estimation error, rotor position, rotor position estimation error and real-time rotor position estimation error for the SRM with variable-hysteresis-band and variable-sampling. For the simulation illustrated in FIGS. 15A-15F, the reference torque, $T_{ref}$ and SRM speed are set at 0.375 Nm and 1200 rpm, similar to FIGS. 14A-14F.

Figure 15A:
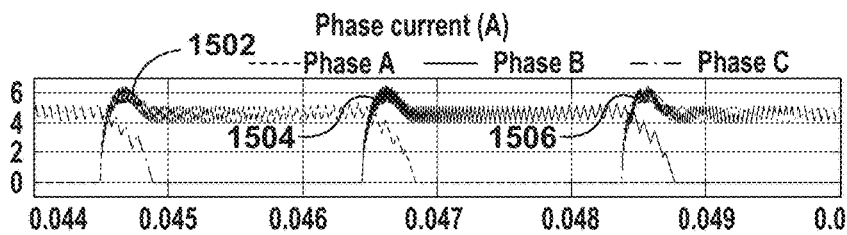
FIG. 15A illustrates a graphical representation of simulation results of phase currents of a three-phase SRM according to another example embodiment.

FIG. 15A illustrates the graphical representation of simulation results of phase currents 1500 of the three-phase 12/8 SRM as a function of time. Graph 1502 illustrates the phase current of phase A as a function of time. Graph 1504 illustrates the phase current of phase B as a function of time. Graph 1506 illustrates the phase current of phase C as a function of time.

Figure 15B:
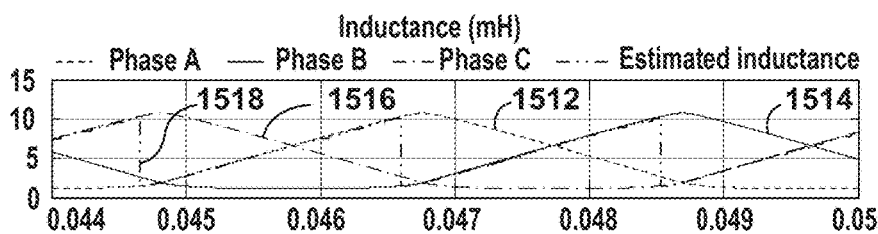
FIG. 15B illustrates a graphical representation of simulation results of inductance of each phase of a three-phase SRM according to another example embodiment.

FIG. 15B illustrates the graphical representation of simulation results of inductance 1510 as a function of time. Graph 1512 illustrates the inductance of phase A as a function of time. Graph 1514 illustrates the inductance of phase B as a function of time. Graph 1516 illustrates the inductance of phase C as a function of time. Graph 1518 illustrates the estimated inductance as a function of time.

Figure 15C:
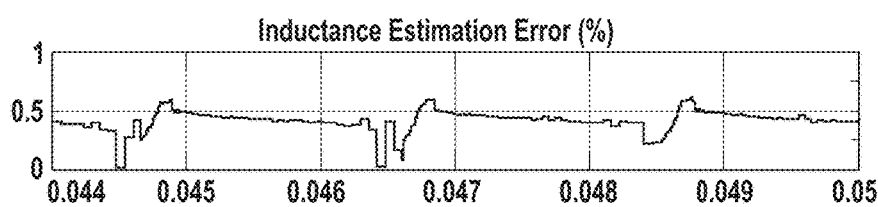
FIG. 15C illustrates a graphical representation of inductance estimation error of a three-phase SRM according to another example embodiment.
Figure 15D:
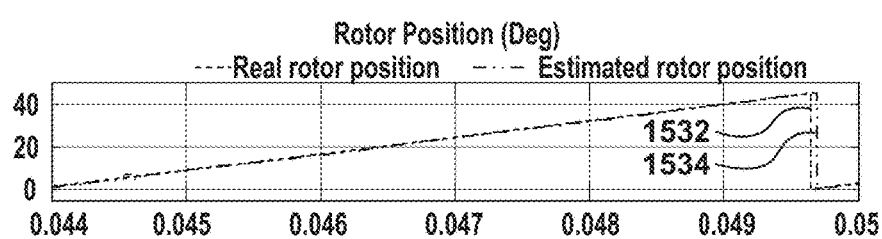
FIG. 15D illustrates a graphical representation of rotor position of a three-phase SRM according to another example embodiment.

FIG. 15C illustrates the graphical representation of inductance estimation error 1520 as a function of time. FIG. 15D illustrates the graphical representation of rotor positions 1530 as a function of time. Graph 1532 illustrates the real rotor position as a function of time. Graph 1534 illustrates the estimated rotor position as a function of time.

Figure 15E:
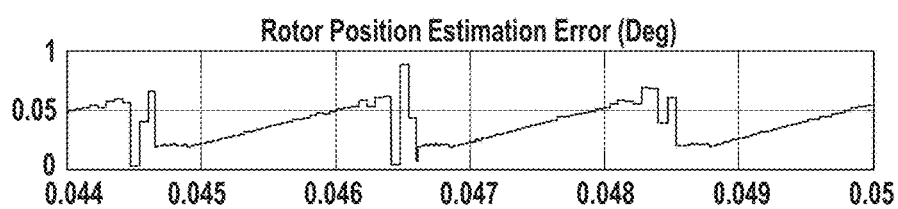
FIG. 15E illustrates a graphical representation of rotor position error of a three-phase SRM according to another example embodiment.

FIG. 15E illustrates the graphical representation of rotor position estimation error 1540 as a function of time. FIG.

15F illustrates the graphical representation of rotor position estimation error 1550 as a function of time.

Figure 15F:
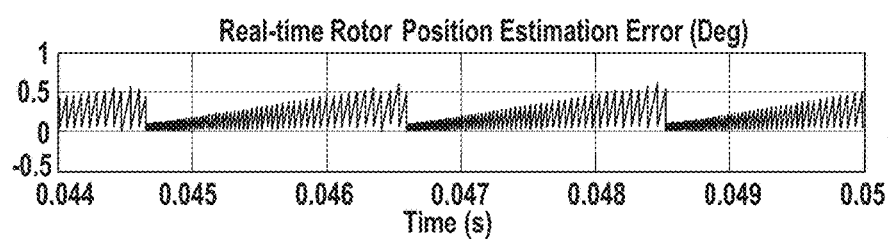
FIG. 15F illustrates a graphical representation of real-time rotor position determination error of a three-phase SRM according to another example embodiment.

As illustrated in FIGS. 14C and 15C, the self-inductance estimation error is much lower in the embodiment of FIGS. 15A-15F where variable-hysteresis-band and variable-sampling techniques are used. Similarly, as illustrated in FIGS. 14F and 15F, the real-time rotor position estimation error is much lower in the embodiment of FIGS. 15A-15F.

As illustrated in FIGS. 14B and 14D, the graphical representation indicating inductance 1410 and, hence, rotor position 1430 is estimated at each switching period. The maximum self-inductance estimation error of the rotor position estimation method without variable-hysteresis-band and sampling, as illustrated in graph 1420, is ±7%. Due to self-inductance estimation error, the maximum rotor position estimation error illustrated in graph 1440 and the maximum real-time rotor position estimation error illustrated in graph 1450 are ±1.5° and ±1.8°, respectively.

By using the variable-hysteresis-band current controller and variable-sampling methods to eliminate the mutual flux effect, the maximum inductance estimation error illustrated in graph 1520 is decreased to +0.6%. As a result, the maximum rotor position estimation error illustrated in graph 1540 and real-time rotor position estimation error illustrated in graph 1550 are decreased to +0.1° and +0.5°.

As the speed of the SRM increases, the estimated inductance or rotor position is updated slower due to the larger switching period. Therefore, the real-time rotor position estimation error increases. However, the rotor position estimation error is not directly affected by operational speed of SRM. Therefore, in the various embodiments illustrated herein, the operational speed of SRM is used as a criterion to evaluate the performance of the rotor position estimation method comprising variable-hysteresis-band and variable-sampling control methods.

Reference is next made to FIGS. 16A-16E illustrating a zoomed out graphical representation of embodiment disclosed in FIGS. 14A-14F where the graphical representations of FIGS. 16A-16E are zoomed out plots of time interval "a" 1408. FIGS. 16A-16E illustrate graphical representations of simulation results of phase current, inductance, inductance estimation error, rotor position and rotor position estimation error for the SRM without variable-hysteresis-band and variable-sampling methods.

Figure 16A:
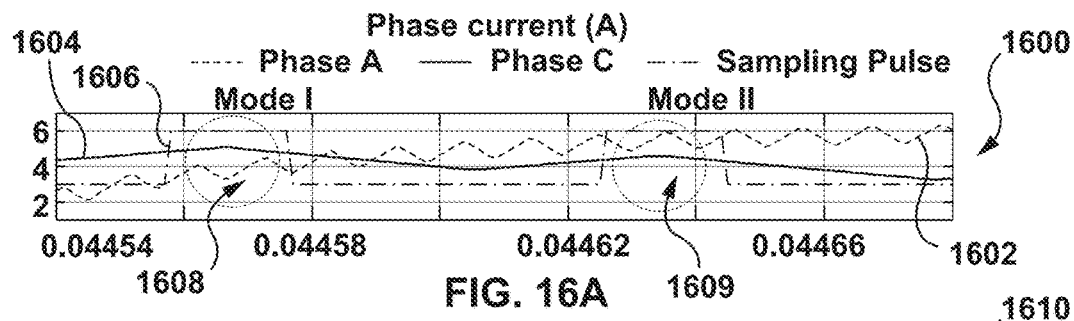
FIG. 16A illustrates a graphical representation of simulation results of phase currents of a three-phase SRM according to an example embodiment.
Figure 16B:
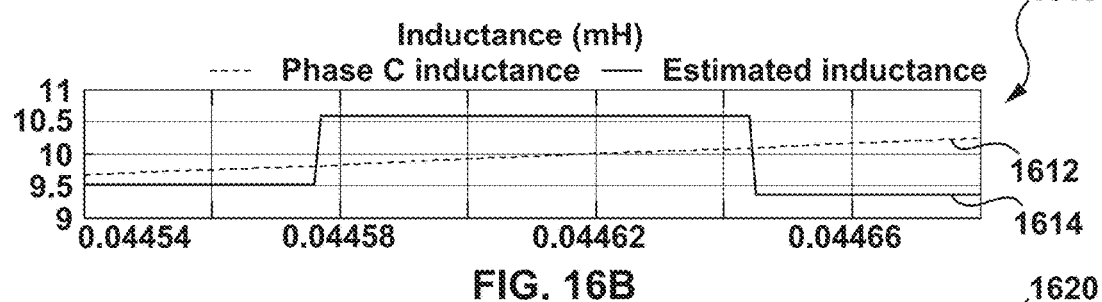
FIG. 16B illustrates a graphical representation of simulation results of inductance of each phase of a three-phase SRM according to an example embodiment.
Figure 16C:
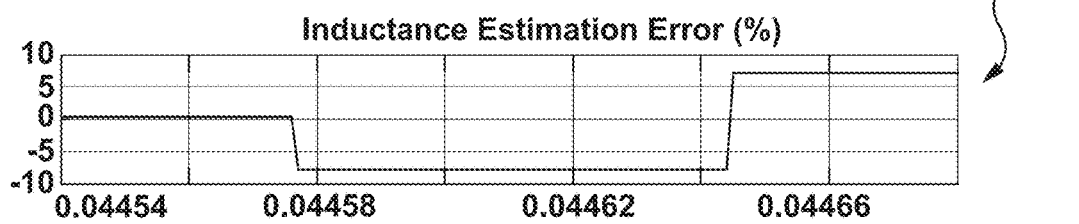
FIG. 16C illustrates a graphical representation of inductance estimation error of a three-phase SRM according to an example embodiment.
Figure 16D:
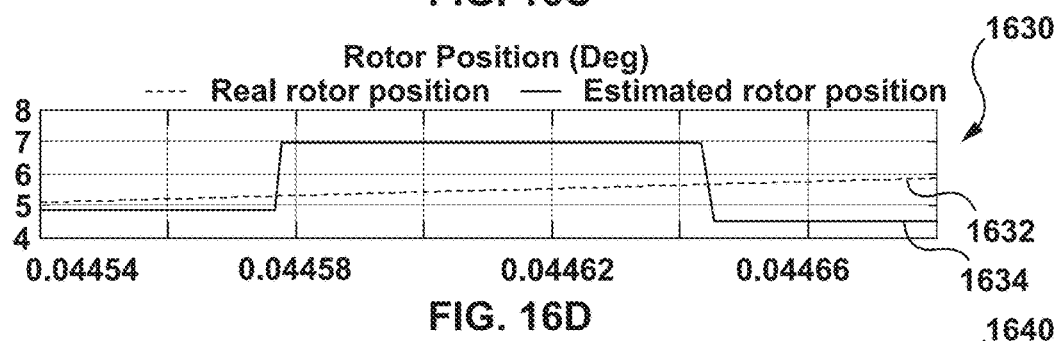
FIG. 16D illustrates a graphical representation of rotor position of a three-phase SRM according to an example embodiment.
Figure 16E:
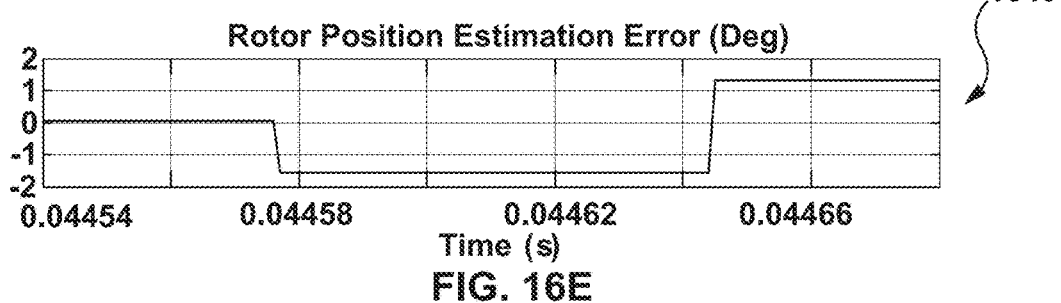
FIG. 16E illustrates a graphical representation of rotor position error of a three-phase SRM according to an example embodiment.

FIG. 16A illustrates the graphical representation of simulation results of phase currents 1600 of the three-phase 12/8 SRM as a function of time. Graph 1602 illustrates the phase current of phase A as a function of time. Graph 1604 illustrates the phase current of phase C as a function of time. Graph 1606 illustrates the sampling pulse. FIG. 16B illustrates the graphical representation of simulation results of inductance 1610 as a function of time. Graph 1612 illustrates the inductance of phase C as a function of time. Graph 1614 illustrates the estimated inductance as a function of time. FIG. 16C illustrates the graphical representation of inductance estimation error 1620 as a function of time. FIG. 16D illustrates the graphical representation of rotor positions 1630 as a function of time. Graph 1632 illustrates the real rotor position as a function of time. Graph 1634 illustrates the estimated rotor position as a function of time. FIG. 16E illustrates the graphical representation of rotor position estimation error 1640 as a function of time.

Reference is next made to FIGS. 17A-17E, which similarly illustrate a zoomed out graphical representation of embodiments disclosed in FIGS. 15A-15F where the graphical representations of FIGS. 17A-17E are zoomed out plots of time interval "a" 1408. FIGS. 17A-17E illustrate graphical representations of simulation results of phase current, inductance, inductance estimation error, rotor position and rotor position estimation error for the SRM without variable-hysteresis-band and variable-sampling.

Figure 17A:
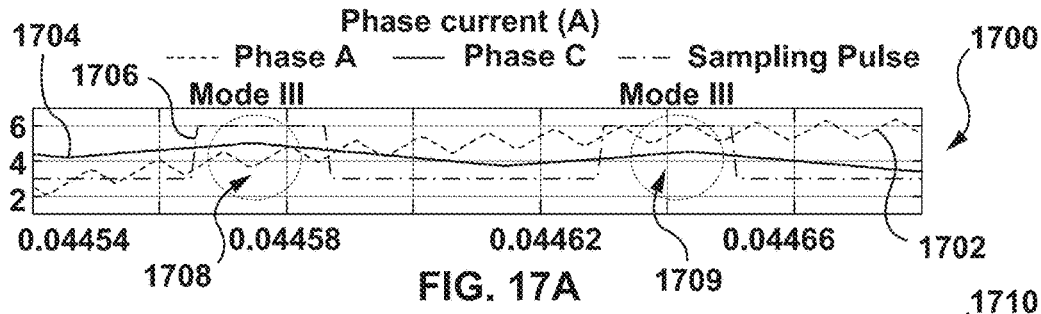
FIG. 17A illustrates a graphical representation of simulation results of phase currents of a three-phase SRM according to another example embodiment.
Figure 17B:
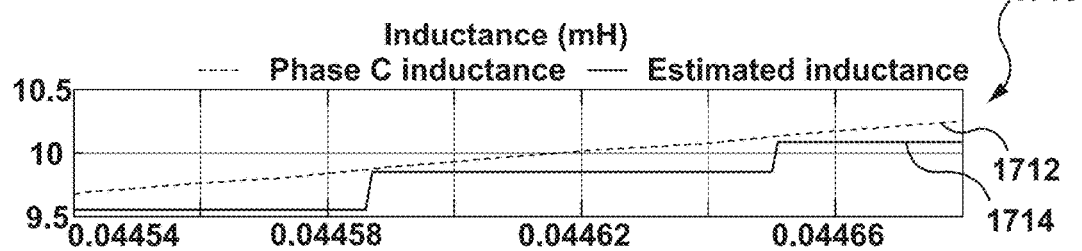
FIG. 17B illustrates a graphical representation of simulation results of inductance of each phase of a three-phase SRM according to another example embodiment.
Figure 17C:
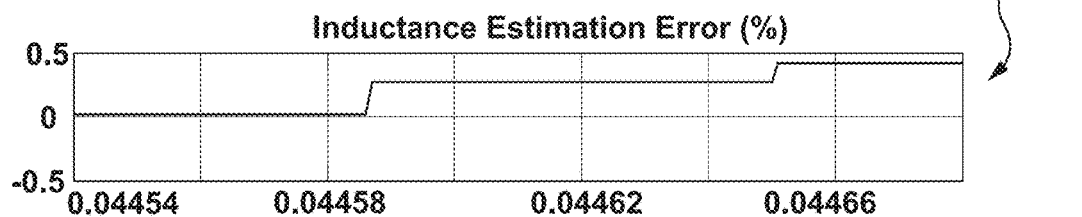
FIG. 17C illustrates a graphical representation of inductance estimation error of a three-phase SRM according to another example embodiment.
Figure 17D:
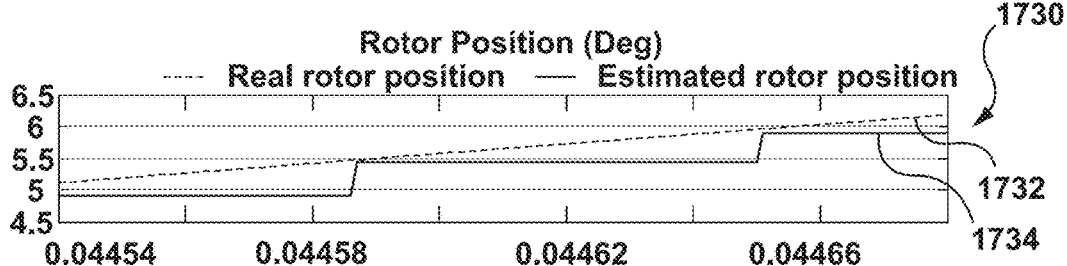
FIG. 17D illustrates a graphical representation of rotor position of a three-phase SRM according to another example embodiment.
Figure 17E:
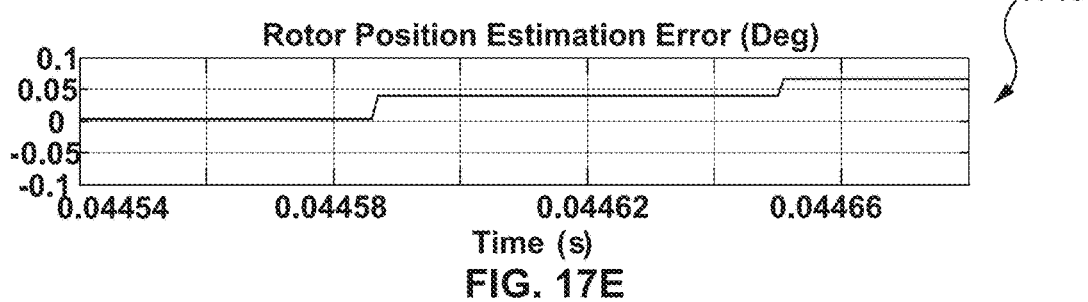
FIG. 17E illustrates a graphical representation of rotor position error of a three-phase SRM according to another example embodiment.

FIG. 17A illustrates the graphical representation of simulation results of phase currents 1700 of the three-phase 12/8 SRM as a function of time. Graph 1702 illustrates the phase current of phase A as a function of time. Graph 1704 illustrates the phase current of phase C as a function of time. Graph 1706 illustrates the sampling pulse. FIG. 17B illustrates the graphical representation of simulation results of inductance 1710 as a function of time. Graph 1712 illustrates the inductance of phase C as a function of time. Graph 1714 illustrates the estimated inductance as a function of time. FIG. 17C illustrates the graphical representation of inductance estimation error 1720 as a function of time. FIG. 17D illustrates the graphical representation of rotor positions 1730 as a function of time. Graph 1732 illustrates the real rotor position as a function of time. Graph 1734 illustrates the estimated rotor position as a function of time. FIG. 17E illustrates the graphical representation of rotor position estimation error 1740 as a function of time.

As illustrated in FIG. 16A, the phase C (outgoing phase) rotor position estimation without variable-hysteresis-band and sampling is working both in Mode I 1608 and Mode II 1609. Due to mutual flux effect of phase A on phase C (incoming phase), Mode I 1608 lead to about +7% self-inductance estimation error as illustrated in graph 1620 and +1.5° rotor position estimation error as illustrated in graph 1640, while Mode II 1609 lead to approximately −7% inductance estimation error as illustrated in graph 1620 and −1.5° position estimation error as illustrated in graph 1640.

As illustrated in FIG. 17A, by applying the variable-sampling outgoing-phase rotor position estimation method, the phase C position estimator is working exclusively in Mode III 1708 and 1709, and therefore the phase A mutual flux effect on phase C is eliminated.

Reference is next made to FIGS. 18A-18E illustrating a zoomed out graphical representation of embodiment disclosed in FIGS. 14A-14F where the graphical representations of FIGS. 16A-16E are zoomed out plots of time interval "b" 1409. FIGS. 18A-18E illustrate graphical representations of simulation results of phase current, inductance, inductance estimation error, rotor position and rotor position estimation error for the SRM without variable-hysteresis-band and variable-sampling.

Figure 18A:
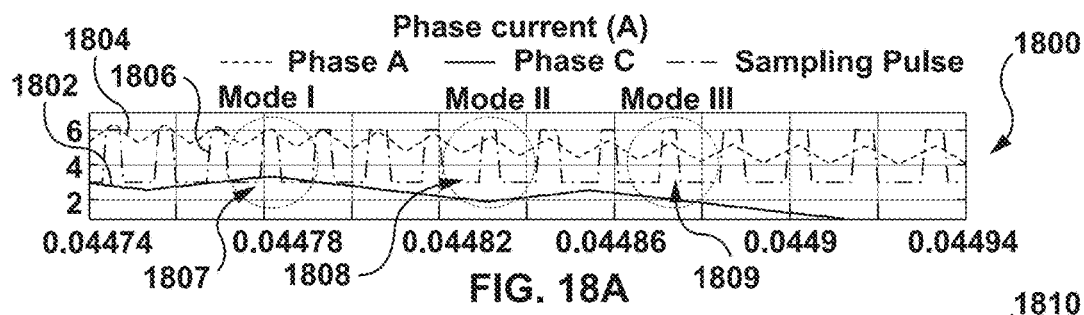
FIG. 18A illustrates a graphical representation of simulation results of phase currents of a three-phase SRM according to an example embodiment.
Figure 18B:
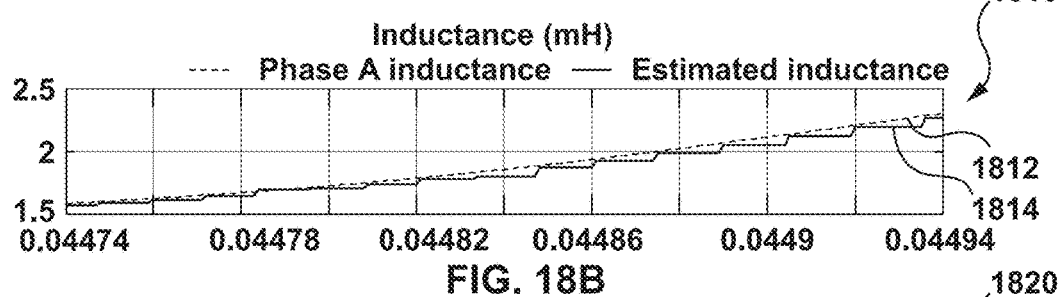
FIG. 18B illustrates a graphical representation of simulation results of inductance of each phase of a three-phase SRM according to an example embodiment.
Figure 18C:
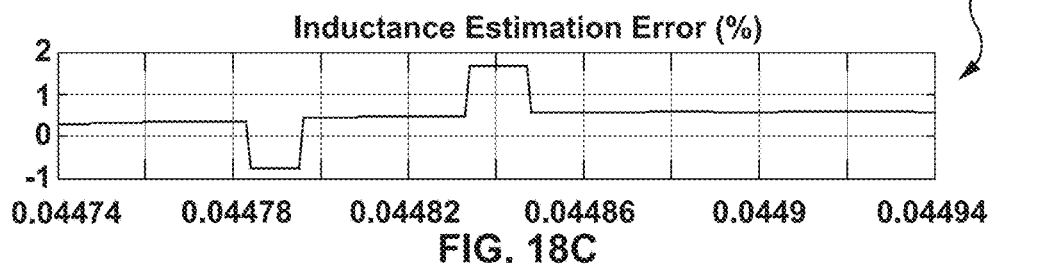
FIG. 18C illustrates a graphical representation of inductance estimation error of a three-phase SRM according to an example embodiment.
Figure 18D:
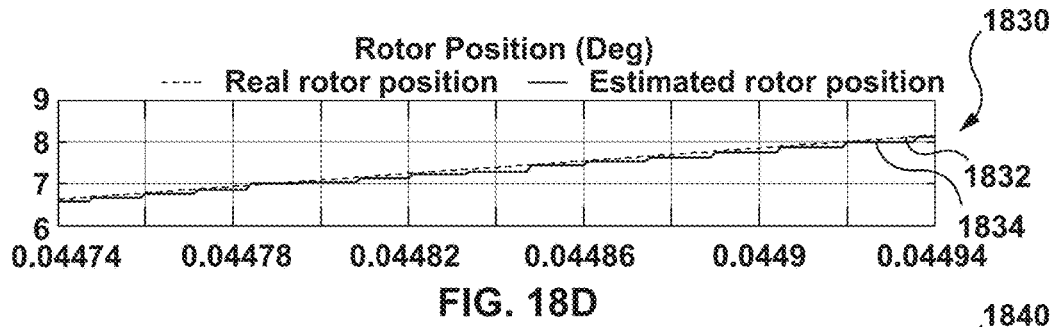
FIG. 18D illustrates a graphical representation of rotor position of a three-phase SRM according to an example embodiment.
Figure 18E:
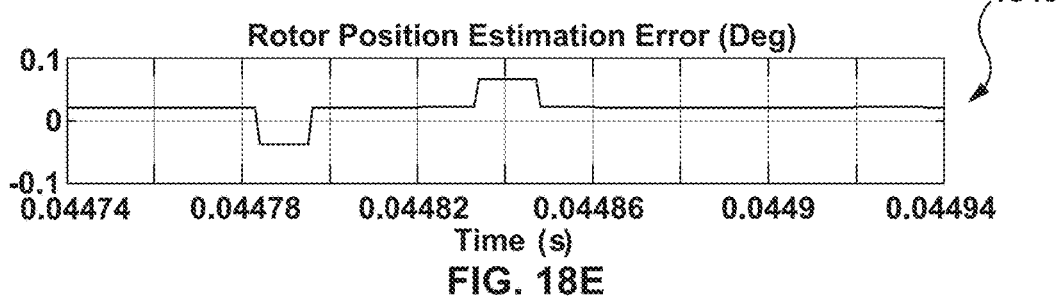
FIG. 18E illustrates a graphical representation of rotor position error of a three-phase SRM according to an example embodiment.

FIG. 18A illustrates the graphical representation of simulation results of phase currents 1800 of the three-phase 12/8 SRM as a function of time. Graph 1802 illustrates the phase current of phase A as a function of time. Graph 1804 illustrates the phase current of phase C as a function of time. Graph 1806 illustrates the sampling pulse. FIG. 18B illustrates the graphical representation of simulation results of inductance 1810 as a function of time. Graph 1812 illustrates the inductance of phase C as a function of time. Graph 1814 illustrates the estimated inductance as a function of time. FIG. 18C illustrates the graphical representation of inductance estimation error 1820 as a function of time. FIG. 18D illustrates the graphical representation of rotor positions 1830 as a function of time. Graph 1832 illustrates the real rotor position as a function of time. Graph 1834 illustrates the estimated rotor position as a function of time. FIG. 18E illustrates the graphical representation of rotor position estimation error 1840 as a function of time.

Reference is next made to FIGS. 19A-19E, which similarly illustrate a zoomed out graphical representation of embodiments disclosed in FIGS. 15A-15F where the graphical representations of FIGS. 19A-19E are zoomed out plots of time interval "b" 1409. FIGS. 19A-19E illustrate graphical representations of simulation results of phase current, inductance, inductance estimation error, rotor position and rotor position estimation error for the SRM without variable-hysteresis-band and variable-sampling.

Figure 19A:
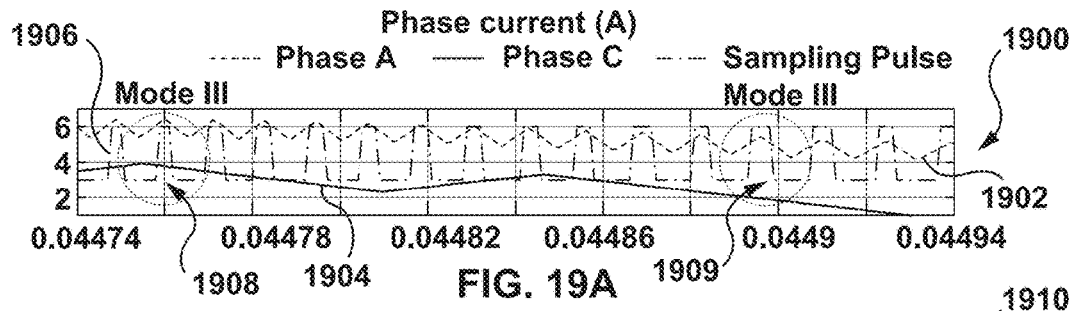
FIG. 19A illustrates a graphical representation of simulation results of phase currents of a three-phase SRM according to another example embodiment.
Figure 19B:
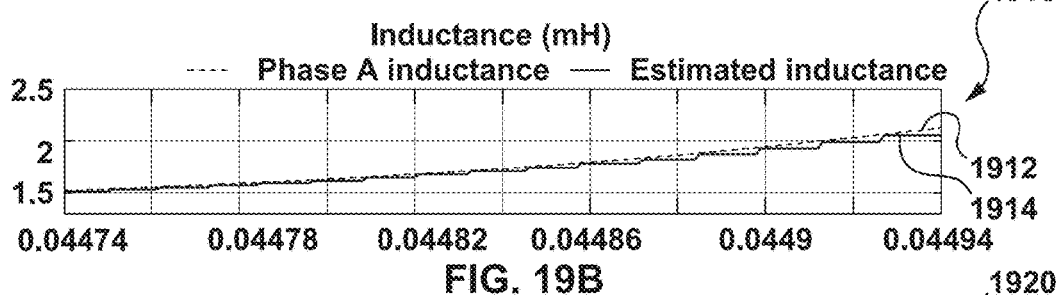
FIG. 19B illustrates a graphical representation of simulation results of inductance of each phase of a three-phase SRM according to another example embodiment.
Figure 19C:
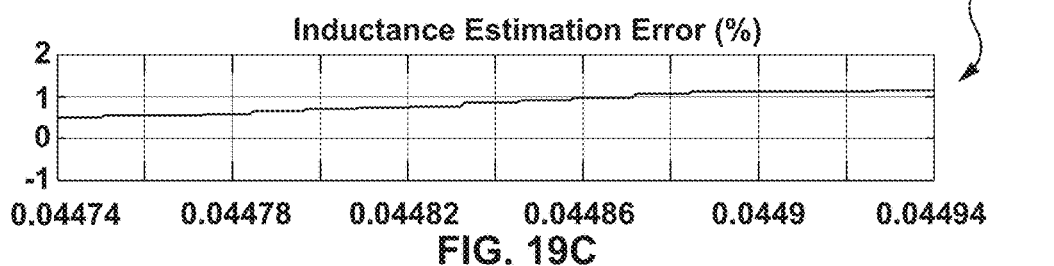
FIG. 19C illustrates a graphical representation of inductance estimation error of a three-phase SRM according to another example embodiment.
Figure 19D:
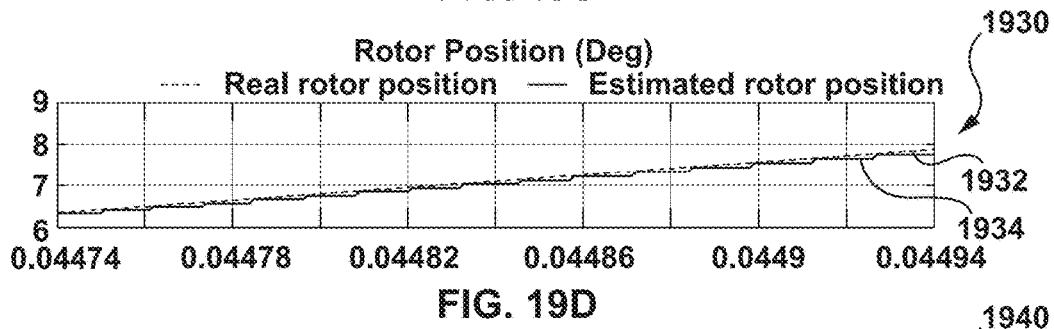
FIG. 19D illustrates a graphical representation of rotor position of a three-phase SRM according to another example embodiment.
Figure 19E:
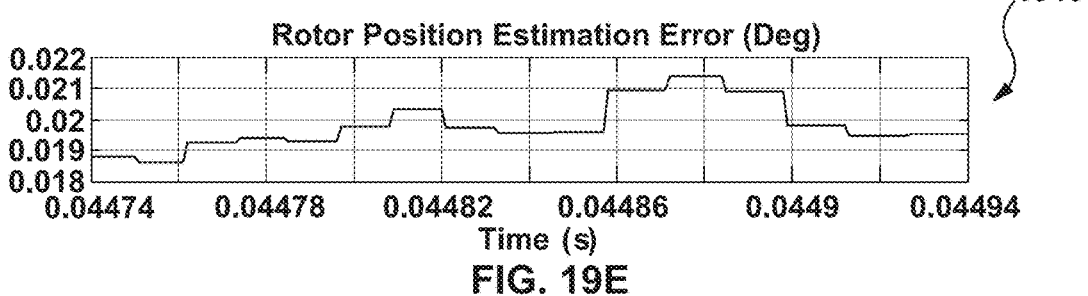
FIG. 19E illustrates a graphical representation of rotor position error of a three-phase SRM according to another example embodiment.

FIG. 19A illustrates the graphical representation of simulation results of phase currents 1900 of the three-phase 12/8 SRM as a function of time. Graph 1902 illustrates the phase current of phase A as a function of time. Graph 1904 illustrates the phase current of phase C as a function of time. Graph 1906 illustrates the sampling pulse. FIG. 19B illustrates the graphical representation of simulation results of inductance 1910 as a function of time. Graph 1912 illustrates the inductance of phase A as a function of time. Graph 1914 illustrates the estimated inductance as a function of time. FIG. 19C illustrates the graphical representation of inductance estimation error 1920 as a function of time. FIG. 19D illustrates the graphical representation of rotor positions 1930 as a function of time. Graph 1932 illustrates the real rotor position as a function of time. Graph 1934 illustrates the estimated rotor position as a function of time. FIG. 19E illustrates the graphical representation of rotor position estimation error 1940 as a function of time.

As shown in FIG. 18A, phase A (incoming phase) rotor position estimation without variable-hysteresis-band and sampling is working in Mode I 1807, Mode II 1808 and Mode III 1809. Due to mutual flux effect of phase C on phase A, Mode I 1807 leads to approximately +1.5% inductance estimation error as illustrated in graph 1820 and +0.05° rotor position estimation error as illustrated in graph 1840, while Mode II 1808 leads to approximately −1.5% inductance estimation error as illustrated in graph 1820 and −0.05° rotor position estimation error as illustrated in graph 1840.

By applying the variable-hysteresis-band current controller for incoming-phase self-inductance estimation, the phase A position estimation is working exclusively in Mode III 1908 and 1909, as shown in FIG. 19A and therefore the phase C mutual flux effect on phase A is eliminated. Compared with the phase A (incoming phase) mutual flux effect on phase C (outgoing phase) as shown in FIGS. 16A-16E, the mutual flux effect of phase C on phase A is negligible.

Reference is next made to FIGS. 20A-20F, which illustrate graphical representations of simulation results of phase current, inductance, inductance estimation error, rotor position, rotor position estimation error and real-time rotor position estimation error for the SRM without variable-hysteresis-band and variable-sampling. For the simulation illustrated in FIGS. 20A-20F, the reference torque, $T_{ref}$, is set at 0.375 Nm and speed at 4500 rpm.

Figure 20A:
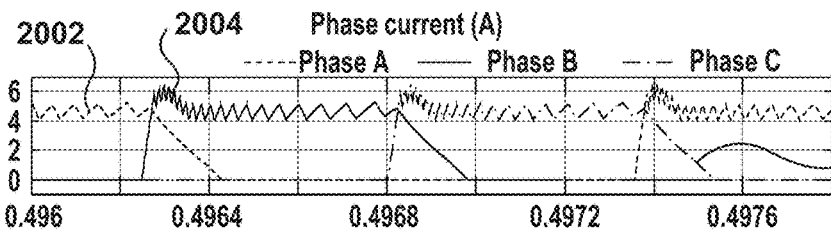
FIG. 20A illustrates a graphical representation of simulation results of phase currents of a three-phase SRM according to an example embodiment.
Figure 20B:
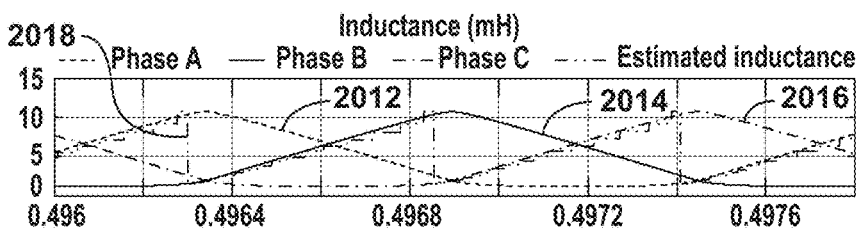
FIG. 20B illustrates a graphical representation of simulation results of inductance of each phase of a three-phase SRM according to an example embodiment.
Figure 20C:
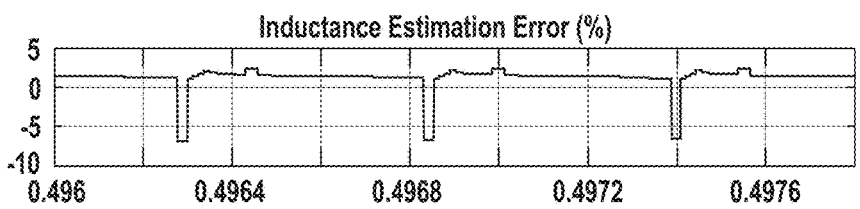
FIG. 20C illustrates a graphical representation of inductance estimation error of a three-phase SRM according to an example embodiment.
Figure 20D:
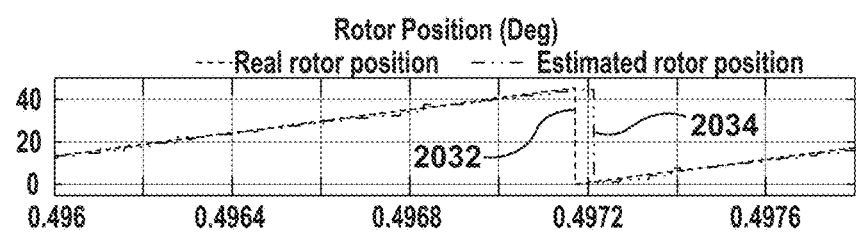
FIG. 20D illustrates a graphical representation of rotor position of a three-phase SRM according to an example embodiment.
Figure 20E:
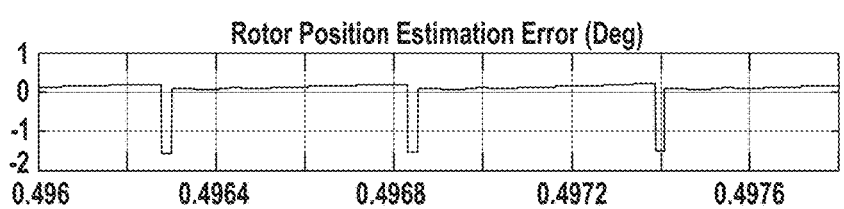
FIG. 20E illustrates a graphical representation of rotor position error of a three-phase SRM according to an example embodiment.
Figure 20F:
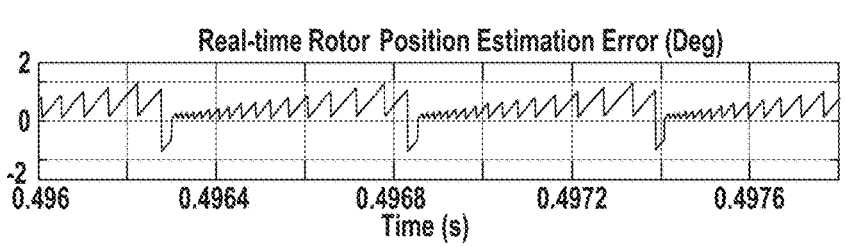
FIG. 20F illustrates a graphical representation of real-time rotor position determination error of a three-phase SRM according to an example embodiment.

FIG. 20A illustrates the graphical representation of simulation results of phase currents 2000 of the three-phase 12/8 SRM as a function of time. Graph 2002 illustrates the phase current of phase A as a function of time. Graph 2004 illustrates the phase current of phase B as a function of time. Graph 2006 illustrates the phase current of phase C as a function of time. FIG. 20B illustrates the graphical representation of simulation results of inductance 2010 as a function of time. Graph 2012 illustrates the inductance of phase A as a function of time. Graph 2014 illustrates the inductance of phase B as a function of time. Graph 2016 illustrates the inductance of phase C as a function of time. Graph 2018 illustrates the estimated inductance as a function of time. FIG. 20C illustrates the graphical representation of inductance estimation error 2020 as a function of time. FIG. 20D illustrates the graphical representation of rotor positions 2030 as a function of time. Graph 2032 illustrates the real rotor position as a function of time. Graph 2034 illustrates the estimated rotor position as a function of time. FIG. 20E illustrates the graphical representation of rotor position estimation error 2040 as a function of time. FIG. 20F illustrates the graphical representation of rotor position estimation error 2050 as a function of time.

Reference is next made to FIGS. 21A-21F, which illustrate graphical representations of simulation results of phase current, inductance, inductance estimation error, rotor position, rotor position estimation error and real-time rotor position estimation error for the SRM with variable-hysteresis-band and variable-sampling. For the simulation illustrated in FIGS. 21A-21F, the reference torque, $T_{ref}$, and SRM speed are set at 0.375 Nm and 4500 rpm, similar to FIGS. 20A-20F.

Figure 21A:
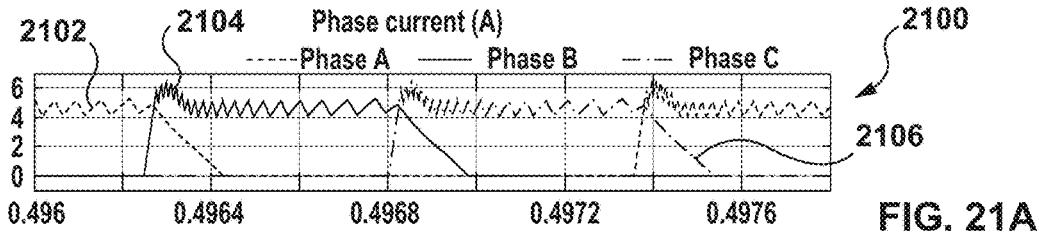
FIG. 21A illustrates a graphical representation of simulation results of phase currents of a three-phase SRM according to another example embodiment.
Figure 21B:
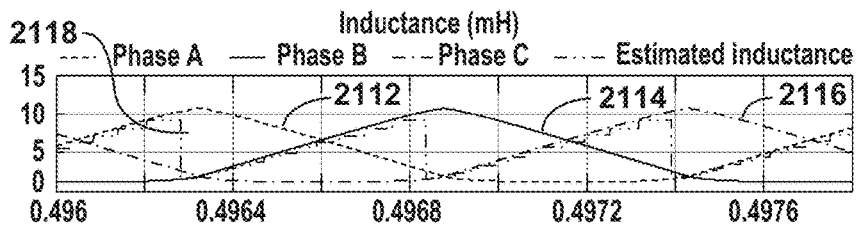
FIG. 21B illustrates a graphical representation of simulation results of inductance of each phase of a three-phase SRM according to another example embodiment.
Figure 21C:
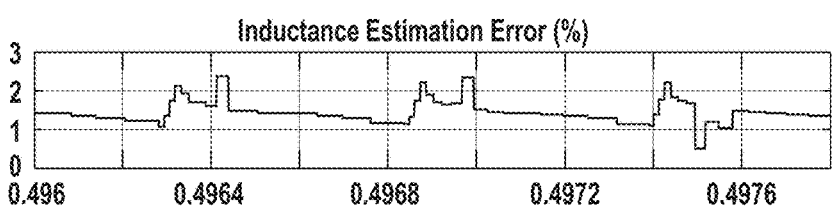
FIG. 21C illustrates a graphical representation of inductance estimation error of a three-phase SRM according to another example embodiment.
Figure 21D:
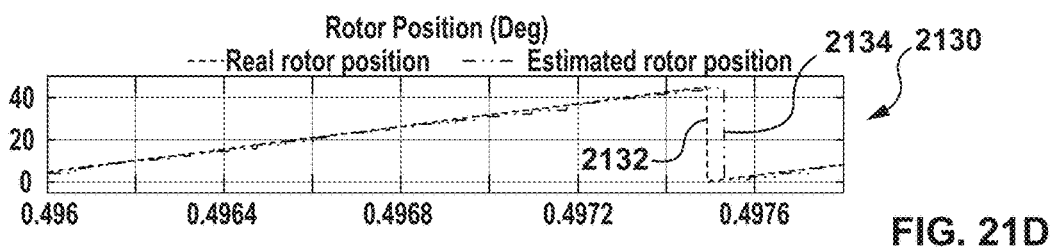
FIG. 21D illustrates a graphical representation of rotor position of a three-phase SRM according to another example embodiment.
Figure 21E:
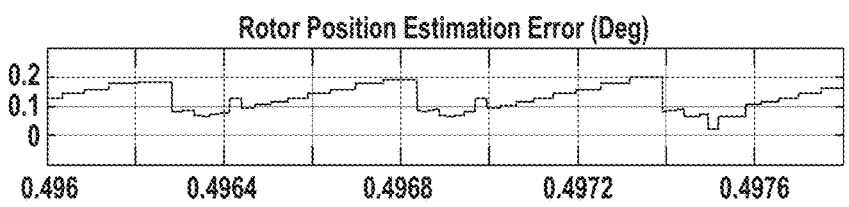
FIG. 21E illustrates a graphical representation of rotor position error of a three-phase SRM according to another example embodiment.
Figure 21F:
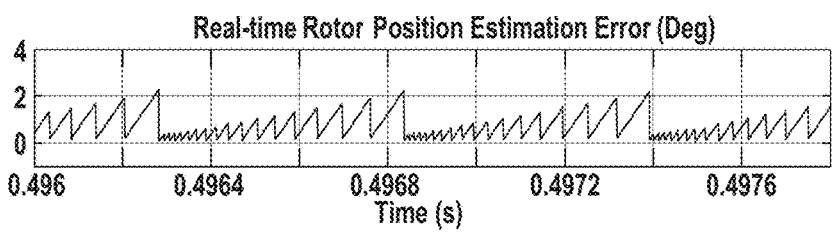
FIG. 21F illustrates a graphical representation of real-time rotor position determination error of a three-phase SRM according to another example embodiment.

FIG. 21A illustrates the graphical representation of simulation results of phase currents 2100 of the three-phase 12/8 SRM as a function of time. Graph 2102 illustrates the phase current of phase A as a function of time. Graph 2104 illustrates the phase current of phase B as a function of time. Graph 2106 illustrates the phase current of phase C as a function of time. FIG. 21B illustrates the graphical representation of simulation results of inductance 2110 as a function of time. Graph 2112 illustrates the inductance of phase A as a function of time. Graph 2114 illustrates the inductance of phase B as a function of time. Graph 2116 illustrates the inductance of phase C as a function of time. Graph 2118 illustrates the estimated inductance as a function of time. FIG. 21C illustrates the graphical representation of inductance estimation error 2120 as a function of time. FIG. 21D illustrates the graphical representation of rotor positions 2130 as a function of time. Graph 2132 illustrates the real rotor position as a function of time. Graph 2134 illustrates the estimated rotor position as a function of time. FIG. 21E illustrates the graphical representation of rotor position estimation error 2140 as a function of time. FIG. 21F illustrates the graphical representation of rotor position estimation error 2150 as a function of time.

As illustrated in FIG. 20C, the inductance estimation error of the rotor estimation method without variable-hysteresis-band and sampling is −7. Due to inductance estimation error, the rotor estimation error illustrated in graph 2040 of FIG. 20E and the real-time rotor position estimation error illustrated in graph 2050 of FIG. 20F are −1.5° and ±2°, respectively.

Compared with simulation results of FIGS. 14A-14F at 1200 rpm, the real-time rotor position estimation error of FIG. 20F is increased due to larger switching period. Also, at 4500 rpm, the phase self-inductance estimation only works in Mode I and Mode III, which lead to only negative inductance estimation error, as illustrated in FIG. 20C.

As illustrated, by using the variable-hysteresis-band current controller and variable-sampling inductance estimation to eliminate the mutual flux effect, the maximum inductance estimation error is decreased to +2.5% as illustrated in graph 2120 of FIG. 21C. As a result, the rotor position estimation error and real-time rotor position estimation error are decreased to +0.5° and +2°, as illustrated in graphs 2140 of FIG. 21E and 2150 of FIG. 21F, respectively. Both self-inductance estimation error and rotor position estimation error is non-negative and thus Mode I is avoided by using the rotor position estimation method.

Reference is next made to FIGS. 22A-22F, which illustrate graphical representations of simulation results of phase current, inductance, inductance estimation error, rotor position, rotor position estimation error and real-time rotor position estimation error for the SRM without variable-hysteresis-band and variable-sampling. For the simulation illustrated in FIGS. 22A-22F, the reference torque, $T_{ref}$, is set at 0.2 Nm and speed at 6000 rpm.

Figure 22A:
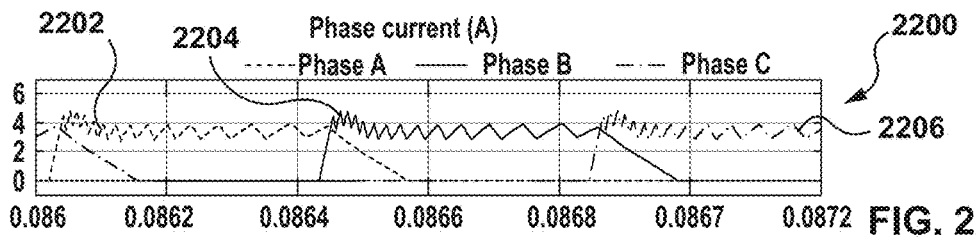
FIG. 22A illustrates a graphical representation of simulation results of phase currents of a three-phase SRM according to an example embodiment.
Figure 22B:
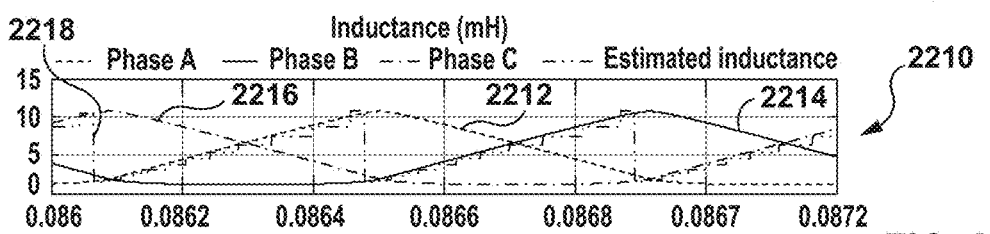
FIG. 22B illustrates a graphical representation of simulation results of inductance of each phase of a three-phase SRM according to an example embodiment.
Figure 22C:
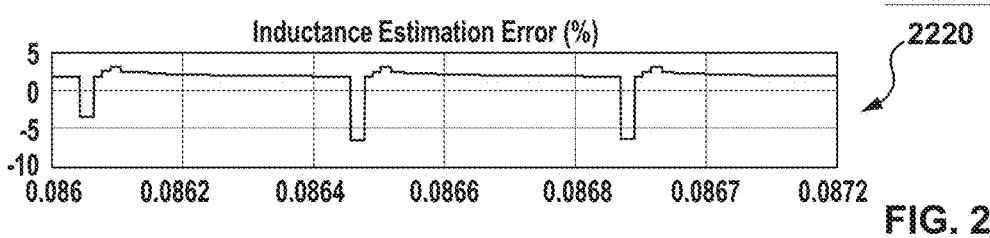
FIG. 22C illustrates a graphical representation of inductance estimation error of a three-phase SRM according to an example embodiment.
Figure 22D:
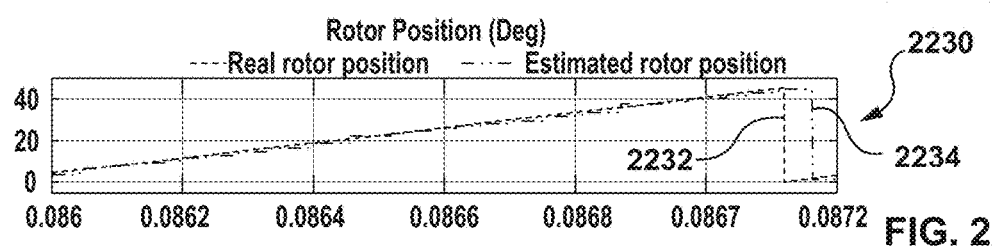
FIG. 22D illustrates a graphical representation of rotor position of a three-phase SRM according to an example embodiment.
Figure 22E:
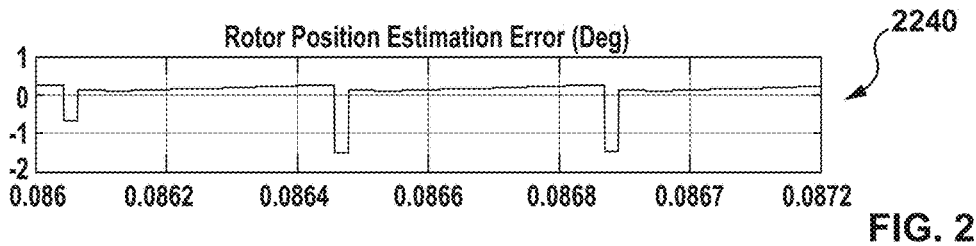
FIG. 22E illustrates a graphical representation of rotor position error of a three-phase SRM according to an example embodiment.
Figure 22F:
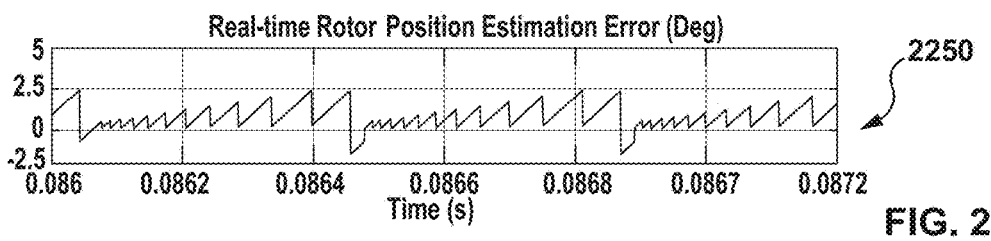
FIG. 22F illustrates a graphical representation of real-time rotor position determination error of a three-phase SRM according to an example embodiment.

FIG. 22A illustrates the graphical representation of simulation results of phase currents 2200 of the three-phase 12/8 SRM as a function of time. Graph 2202 illustrates the phase current of phase A as a function of time. Graph 2204 illustrates the phase current of phase B as a function of time. Graph 2206 illustrates the phase current of phase C as a function of time. FIG. 22B illustrates the graphical representation of simulation results of inductance 2210 as a function of time. Graph 2212 illustrates the inductance of phase A as a function of time. Graph 2214 illustrates the inductance of phase B as a function of time. Graph 2216 illustrates the inductance of phase C as a function of time. Graph 2218 illustrates the estimated inductance as a function of time. FIG. 22C illustrates the graphical representation of inductance estimation error 2220 as a function of time. FIG. 22D illustrates the graphical representation of rotor positions 2230 as a function of time. Graph 2232 illustrates the real rotor position as a function of time. Graph 2234 illustrates the estimated rotor position as a function of time. FIG. 22E illustrates the graphical representation of rotor position estimation error 2240 as a function of time. FIG. 22F illustrates the graphical representation of rotor position estimation error 2250 as a function of time.

Reference is next made to FIGS. 23A-23F, which illustrate graphical representations of simulation results of phase current, inductance, inductance estimation error, rotor position, rotor position estimation error and real-time rotor position estimation error for the SRM with variable-hysteresis-band and variable-sampling. For the simulation illustrated in FIGS. 23A-23F, the reference torque, $T_{ref}$, and SRM speed are set at 0.2 Nm and 6000 rpm, similar to FIGS. 22A-22F.

Figure 23A:
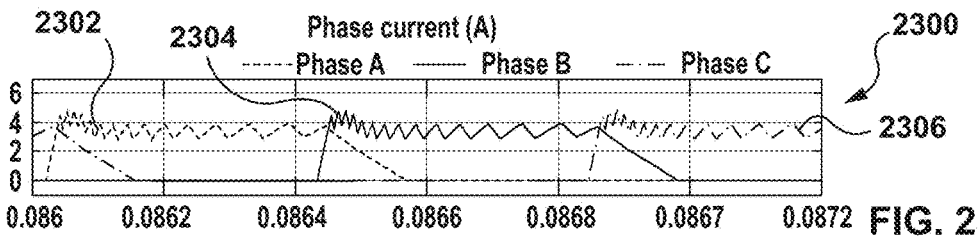
FIG. 23A illustrates a graphical representation of simulation results of phase currents of a three-phase SRM according to another example embodiment.
Figure 23B:
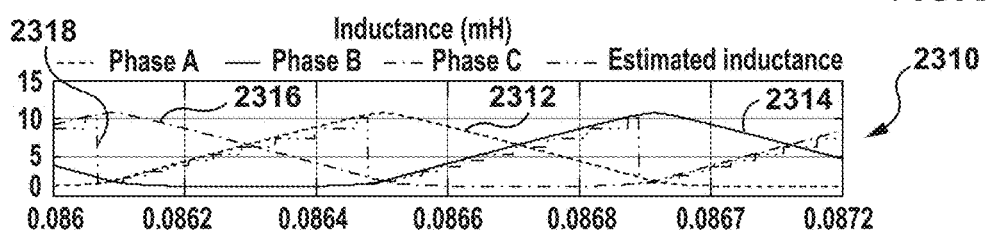
FIG. 23B illustrates a graphical representation of simulation results of inductance of each phase of a three-phase SRM according to another example embodiment.
Figure 23C:
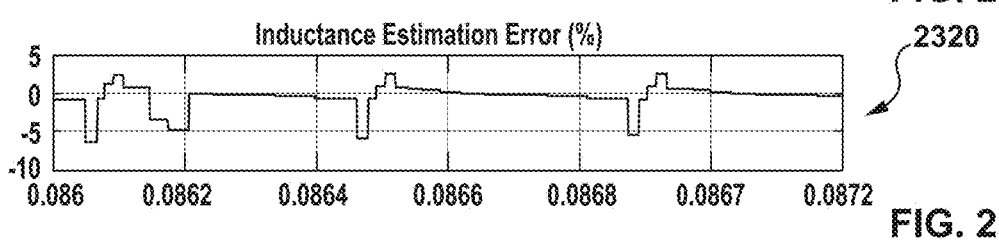
FIG. 23C illustrates a graphical representation of inductance estimation error of a three-phase SRM according to another example embodiment.
Figure 23D:
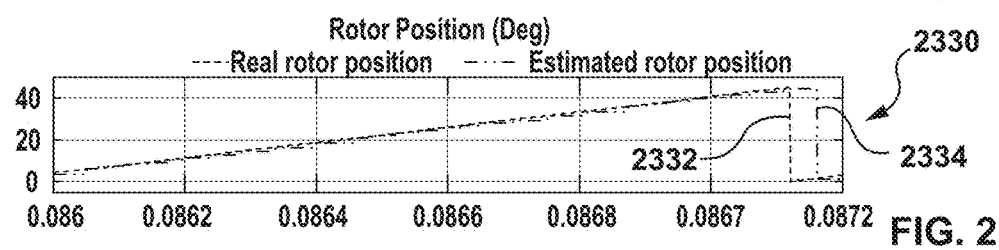
FIG. 23D illustrates a graphical representation of rotor position of a three-phase SRM according to another example embodiment.
Figure 23E:
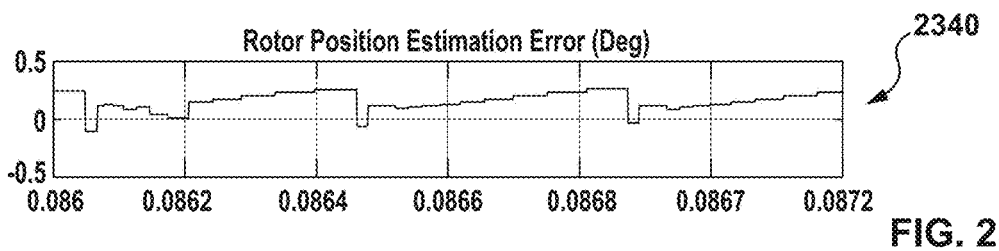
FIG. 23E illustrates a graphical representation of rotor position error of a three-phase SRM according to another example embodiment.
Figure 23F:
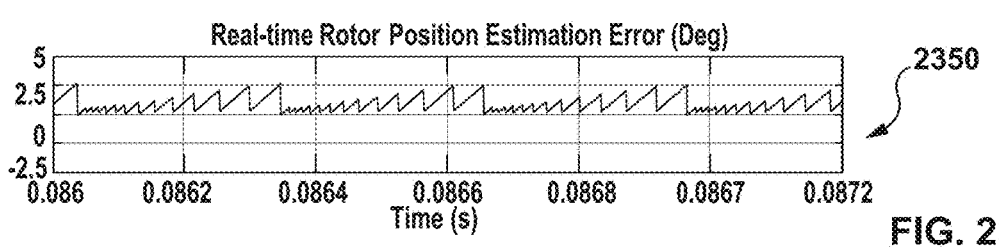
FIG. 23F illustrates a graphical representation of real-time rotor position determination error of a three-phase SRM according to another example embodiment.

FIG. 23A illustrates the graphical representation of simulation results of phase currents 2300 of the three-phase 12/8 SRM as a function of time. Graph 2302 illustrates the phase current of phase A as a function of time. Graph 2304 illustrates the phase current of phase B as a function of time. Graph 2306 illustrates the phase current of phase C as a function of time. FIG. 23B illustrates the graphical representation of simulation results of inductance 2310 as a function of time. Graph 2312 illustrates the inductance of phase A as a function of time. Graph 2314 illustrates the inductance of phase B as a function of time. Graph 2316 illustrates the inductance of phase C as a function of time. Graph 2318 illustrates the estimated inductance as a function of time. FIG. 23C illustrates the graphical representation of inductance estimation error 2320 as a function of time. FIG. 23D illustrates the graphical representation of rotor positions 2330 as a function of time. Graph 2332 illustrates the real rotor position as a function of time. Graph 2334 illustrates the estimated rotor position as a function of time. FIG. 23E illustrates the graphical representation of rotor position estimation error 2340 as a function of time. FIG. 23F illustrates the graphical representation of rotor position estimation error 2350 as a function of time.

As illustrated in graph 2220 of FIG. 22C, the self-inductance estimation error of the rotor estimation method without variable-hysteresis-band and sampling is −7%, leading to −1.5° rotor position estimation error, as illustrated in graph 2240 of FIG. 22E. The real-time rotor estimation error is −1.5° and +2.5° as illustrated in graph 2250 of FIG. 22F. The negative real-time rotor position estimation error is mainly contributed by mutual flux and positive real-time error is mostly due to larger switching period. By using the proposed rotor position estimation method, negative real-time rotor position estimation error is eliminated due to elimination of mutual flux effect as illustrated in graph 2350 of FIG. 23F.

Reference is next made to FIGS. 24A, 24B, 25A and 25B, which illustrates graphical representations of experimental results of rotor position estimation according to the various embodiments illustrated herein. The graphical representations of experimental results are based on a 2.3 kW, 6000 rpm, three-phase 12/8 SRM with a DC-link voltage of 300V. Furthermore, the sampling time $t_{sample}$ is set to 5μs. Hysteresis control is used to control the phase current, and the current hysteresis band is set to be 0.5 A. In the embodiments of FIGS. 24A, 24B, 25A and 25B, the self-inductance characteristics are stored as look up tables in FPGA. Rotor position is estimated from this look-up table using the estimated phase self-inductance.

Figure 24A:
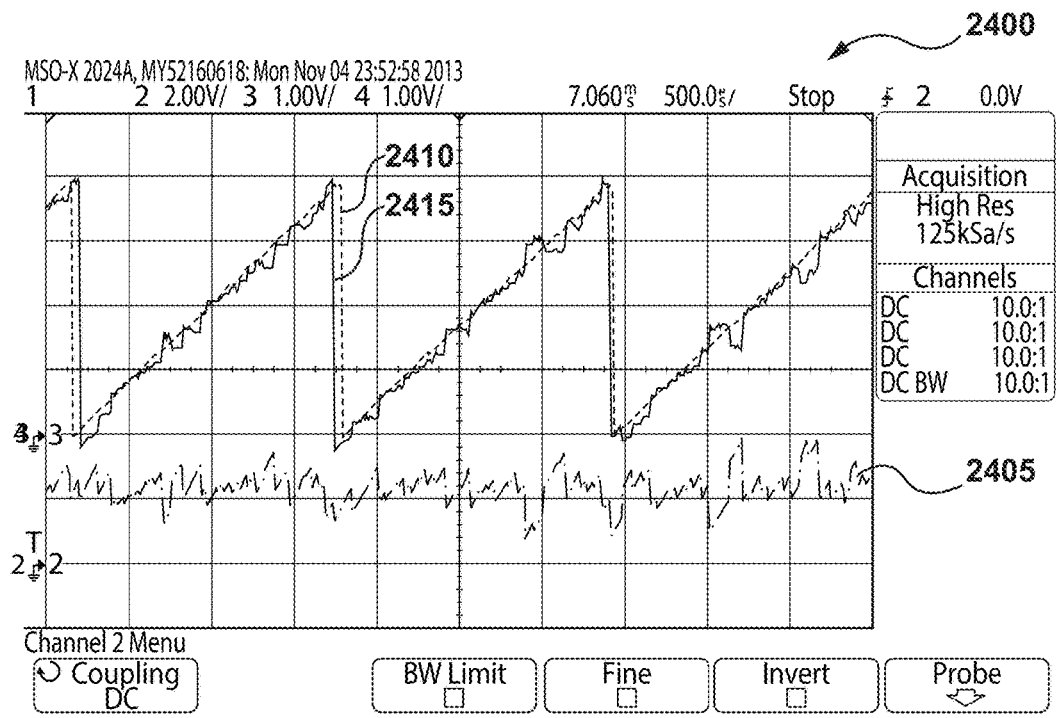
FIG. 24A illustrates a graphical representation of experimental results of rotor position estimation according to an example embodiment.
Figure 24B:
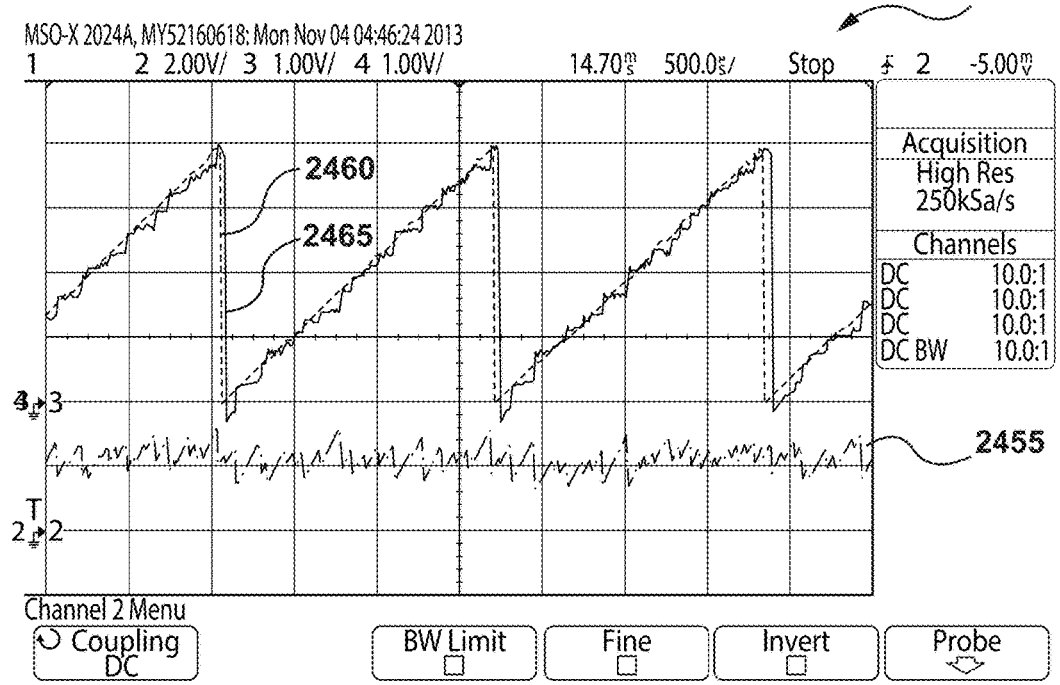
FIG. 24B illustrates a graphical representation of experimental results of rotor position estimation according to another example embodiment.

Reference is first made to FIGS. 24A and 24B, illustrating graphical representations 2400 and 2450, respectively, of experimental results of rotor position estimation, where the torque reference is set to 0.375 Nm and the SRM speed is set to 4500 rpm. FIG. 24A illustrates graph 2405 representing the rotor position estimation error, graph 2415 representing the real rotor position and graph 2410 representing the estimated rotor position without variable-hysteresis-band and sampling. FIG. 24B illustrates graph 2455 representing the rotor position estimation error, graph 2460 representing the real rotor position and graph 2465 representing the estimated rotor position with variable-hysteresis-band and sampling.

As illustrated in graph 2405, the real-time rotor position estimation error without variable-hysteresis-band and sampling is +5° and −3.3°. As illustrated in graph 2455, the real-time rotor position estimation error of the proposed method is decreased to +2.8° and −1.7°, showing an increase of approximately 2° in rotor position estimation accuracy.

Figure 25A:
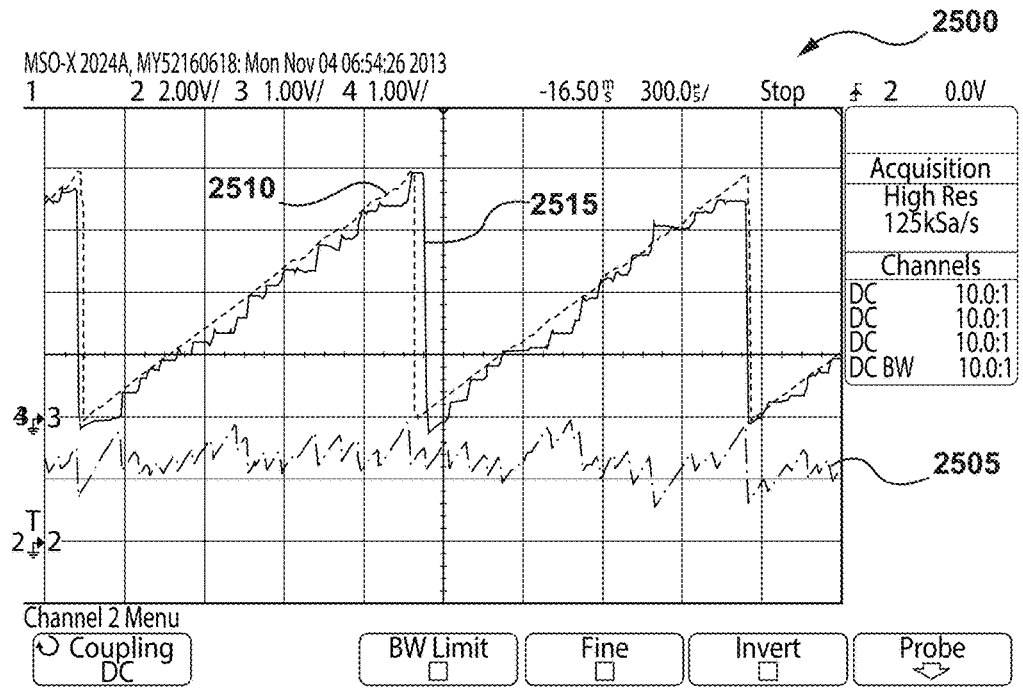
FIG. 25A illustrates a graphical representation of experimental results of rotor position estimation according to an example embodiment.
Figure 25B:
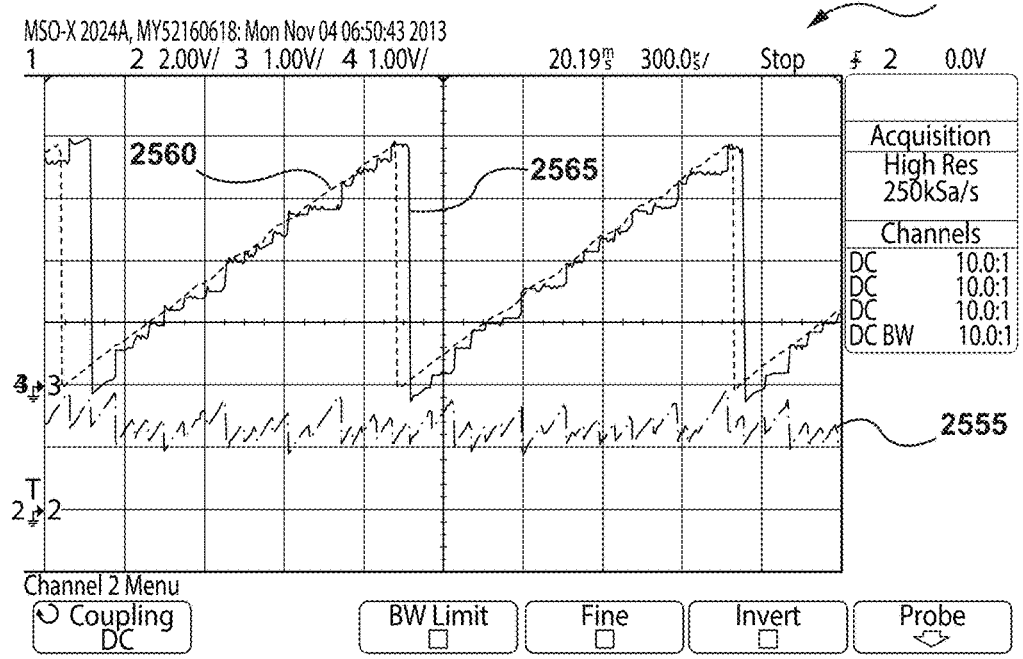
FIG. 25B illustrates a graphical representation of experimental results of rotor position estimation according to another example embodiment.

Reference is next made to FIGS. 25A and 25B, illustrating graphical representations 2500 and 2550, respectively, of experimental results of rotor position estimation, where the torque reference is set to 0.2 Nm and the SRM speed is set to 6000 rpm. FIG. 25A illustrates graph 2505 representing the rotor position estimation error, graph 2515 representing the real rotor position and graph 2510 representing the estimated rotor position without variable-hysteresis-band and sampling. FIG. 25B illustrates graph 2555 representing the rotor position estimation error, graph 2560 representing the real rotor position and graph 2565 representing the estimated rotor position with variable-hysteresis-band and sampling.

As illustrated in graph 2505, the real-time rotor position estimation error without variable-hysteresis-band and sampling is +5° and −2.8°. As illustrated in graph 2555, the method comprising variable-hysteresis-band and sampling shows only positive rotor position estimation error up to +5° and therefore mutual flux effect on rotor position estimation in Mode I is eliminated.

Although the various embodiments illustrated herein are based on a three-phase switched reluctance motor, the teachings and concepts discussed herein are also applicable to any other multi-phase switched reluctance motor.

The above-described embodiments and applications of the present invention are intended only to be examples. Alterations, modifications and variations may be effected to the particular embodiments by those of ordinary skill in the art, in light of this teaching, without departing from the scope of the claimed invention.

The invention claimed is:

1. A switched reluctance motor system comprising:
a multi-phase switched reluctance motor; and
a controller coupled to the multi-phase switched reluctance motor, the controller configured to:
sample a positive slope of a phase current corresponding to a first phase of the multi-phase switched reluctance motor at a first sample time;
sample a negative slope of the phase current corresponding to the first phase of the multi-phase switched reluctance motor at a second sample time;
sample a first slope of a phase current corresponding to a second phase of the multi-phase switched reluctance motor at the first sample time;
sample a second slope of the phase current corresponding to the second phase of the multi-phase switched reluctance motor at the second sample time;
estimate self-inductance of the first phase from the positive slope and the negative slope; and
operate the multi-phase switched reluctance motor in an error reduction mode using one of a variable-hysteresis-band current control method in which a switching state of the second phase is controlled and a variable-sampling method in which one of the sample times is adjusted
such that when the positive slope of the phase current corresponding to the first phase of the multi-phase switched reluctance motor is sampled at the first sample time and when the negative slope of the phase current corresponding to the first phase of the multi-phase switched reluctance motor is sampled at the second sample time, the first and second slopes of the phase current corresponding to the second phase of the multi-phase switched reluctance motor have the same sign at the first sample time and the second sample time whereby the error in estimating the self-inductance of the first phase due to mutual flux from the second phase is reduced.

2. The switched reluctance motor system of claim 1, wherein:
if the first phase of the multi-phase switched reluctance motor is an incoming phase, the controller is configured to apply the variable-hysteresis-band current control method, and
if the first phase of the multi-phase switched reluctance motor is an outgoing phase, the controller is configured to apply the variable-sampling method.

3. The switched reluctance motor system of claim 1, wherein the first phase of the multi-phase switched reluctance motor is an incoming phase and the second phase is an outgoing phase, and the controller is configured to control the switching state of the phase current of the outgoing phase such that the sign of the phase current of the outgoing phase remains unchanged between the first sample time and the second sample time.

4. The switched reluctance motor system of claim 1, wherein the first phase of the multi-phase switched reluctance motor is an outgoing phase and the second phase is an incoming phase, and the controller is configured to adjust the second sample time to a new second sample time,
wherein at the new second sample time,
the outgoing phase is sampled at the negative slope of the corresponding phase current, and
the phase current corresponding to the incoming phase of the multi-phase switched reluctance motor has the same sign as the sign of the slope of the incoming phase current at the first sample time.

5. The switched reluctance motor system of claim 1, wherein the controller is further configured to generate a rotor position based on the estimated self-inductance.

6. The switched reluctance motor system of claim 3, wherein the controller comprises a voltage source and at least one switch coupled to the voltage source, and wherein if the phase current of the outgoing phase is lower than a low reference current, the controller is configured to turn on the at least one switch.

7. The switched reluctance motor system of claim 3, wherein the controller comprises a voltage source and at least one switch coupled to the voltage source, and wherein if the phase current of the outgoing phase is higher than a high reference current, the controller is configured to turn off the at least one switch.

8. The switched reluctance motor system of claim 5, wherein for each phase of the multi-phase switched reluctance motor, the controller is configured to:
estimate self-inductance of the phase in an active region corresponding to that phase, and
determine a rotor position corresponding to the active region based on the estimated self-inductance.

9. The switched reluctance motor system of claim 8, wherein if the self-inductance of the phase reaches a maximum value, the controller is configured to estimate self-inductance and rotor position in a second active region corresponding to the phase.

10. A method of reducing error in estimating self-inductance of a first phase due to mutual flux from a second phase in a multi-phase switched reluctance motor, the method comprising:
sampling a positive slope of a phase current corresponding to the first phase of the multi-phase switched reluctance motor at a first sample time;
sampling a negative slope of the phase current corresponding to the first phase of the multi-phase switched reluctance motor at a second sample time;
sampling a first slope of a phase current corresponding to the second phase of the multi-phase switched reluctance motor at the first sample time;
sampling a second slope of the phase current corresponding to the second phase of the multi-phase switched reluctance motor at the second sample time;
estimating self-inductance of the first phase from the positive slope and the negative slope; and
operating the multi-phase switched reluctance motor in an error reduction mode using one of a variable-hysteresis-band current control method in which a switching state of the second phase is controlled and a variable-sampling method in which one of the sample times is adjusted
such that when the positive slope of the phase current corresponding to the first phase of the multi-phase switched reluctance motor is sampled at the first sample time and when the negative slope of the phase current corresponding to the first phase of the multi-phase switched reluctance motor is sampled at the second sample time, the first and second slopes of the phase current corresponding to the second phase of the multi-phase switched reluctance motor have the same sign at the first sample time and the second sample time whereby the error in estimating the self-inductance of the first phase due to mutual flux from the second phase is reduced.

11. The method of claim 10, wherein:
if the first phase of the multi-phase switched reluctance motor is an incoming phase, the method comprises applying the variable-hysteresis-band current control to the multi-phase switched reluctance motor; and if the first phase of the multi-phase switched reluctance motor is an outgoing phase, the method comprises applying the variable-sampling control to the multi-phase switched reluctance motor.

12. The method of claim 10, wherein the first phase of the multi-phase switched reluctance motor is an incoming phase and the second phase is an outgoing phase, and the method comprises:

controlling the switching state of the phase current of the outgoing phase wherein the sign of the phase current of the outgoing phase remains unchanged between the first sample time and the second sample time.

13. The method of claim 10, wherein the first phase of the multi-phase switched reluctance motor is an outgoing phase and the second phase is an incoming phase, the method comprises:

adjusting the second sample time to a new second sample time, wherein at the new second sample time, the outgoing phase is sampled at the negative slope of the corresponding phase current, and the phase current corresponding to the incoming phase of the multi-phase switched reluctance motor has the same sign as the sign of the slope of the incoming phase current at the first sample time.

14. The method of claim 10, further comprising:

generating a rotor position based on the estimated self-inductance.

15. The method of claim 12, wherein if the phase current of the outgoing phase is lower than a low reference current, the method comprises switching on the phase current of the outgoing phase.

16. The method of claim 12, wherein if the phase current of the outgoing phase is higher than a high reference current, the method comprises switching off the phase current of the outgoing phase.

17. A method of determining rotor position of a multi-phase switched reluctance motor, the method comprising:

sampling a positive slope of a phase current corresponding to a first phase of the multi-phase switched reluctance motor at a first sample time;

sampling a negative slope of the phase current corresponding to the first phase of the multi-phase switched reluctance motor at a second sample time;

sampling a first slope of a phase current corresponding to a second phase of the multi-phase switched reluctance motor at the first sample time;

sampling a second slope of the phase current corresponding to the second phase of the multi-phase switched reluctance motor at the second sample time;

estimating self-inductance of the first phase of the multi-phase switched reluctance motor from the positive slope and the negative slope while operating the multi-phase switched reluctance motor in an error reduction mode using one of a variable-hysteresis-band current control method in which a switching state of the first or second phase is controlled and a variable-sampling method in which one of the sample times is adjusted, such that, for each phase of the multi-phase switched reluctance motor, when the positive slope of the phase current corresponding to the first phase is sampled and when the negative slope of the phase current corresponding to the first phase is sampled the first and second slopes of the phase current corresponding to the second phase have the same sign at the first sample time and the second sample time whereby the error in estimating the self-inductance of the first phase due to mutual flux from the second phase is reduced;

generating a rotor position corresponding to the first phase based on the estimated self-inductance of the first phase.

18. The method of claim 17, wherein the first phase of the multi-phase switched reluctance motor is an outgoing phase the second phase is an incoming phase, and operating the multi-phase switched reluctance motor in the error reduction mode comprises:

adjusting the second sample time to a new second sample time, wherein at the new second sample time, the outgoing phase is sampled at the negative slope of the corresponding phase current, and the phase current corresponding to the incoming phase of the multi-phase switched reluctance motor has the same sign as the sign of the slope of the phase current corresponding to the incoming phase at the first sample time.

19. The method of claim 17, wherein for each phase of the multi-phase switched reluctance motor, the method comprises:

estimating self-inductance of the phase in an active region corresponding to that phase, and determining a rotor position corresponding to the active region based on the estimated self-inductance.

20. A method of determining rotor position of a multi-phase switched reluctance motor, the method comprising:

estimating self-inductance of an incoming phase of the multi-phase switched reluctance motor in an error reduction mode, wherein, for each phase of the multi-phase switched reluctance motor, the error in estimating the self-inductance of the incoming phase due to mutual flux from an outgoing phase is reduced; and generating a rotor position corresponding to the incoming phase based on the self-inductance of the incoming phase;

wherein estimating the self-inductance of the incoming phase in an error reduction mode comprises:

sampling a positive slope of a phase current corresponding to the incoming phase of the multi-phase switched reluctance motor at a first sample time;

sampling a negative slope of the phase current corresponding to the incoming phase of the multi-phase switched reluctance motor at a second sample time;

sampling a first slope of a phase current corresponding to the outgoing phase of the multi-phase switched reluctance motor at the first sample time;

sampling a second slope of the phase current corresponding to the outgoing phase of the multi-phase switched reluctance motor at the second sample time;

estimating the self-inductance from the positive slope and the negative slope; and adjusting at least one characteristic of the phase current corresponding to the outgoing phase of the multi-phase switched reluctance motor by controlling the switching state of the phase current of the second phase, such that the first and second slopes of the phase current corresponding to the outgoing phase have the same sign at the first sample time and the second sample time whereby the error in estimating the self-inductance of the incoming phase due to mutual flux from the outgoing phase is reduced.

21. The method of claim 20, wherein the sign of the phase current of the outgoing phase remains unchanged between the first sample time and the second sample time.

22. The method of claim 21, wherein if the phase current of the outgoing phase is lower than a low reference current, the method comprises switching on the phase current of the outgoing phase.

23. The method of claim 21, wherein if the phase current of the outgoing phase is higher than a high reference current, the method comprises switching off the phase current of the outgoing phase.

\* \* \* \* \*